(12) United States Patent
Levitsky et al.

(10) Patent No.: US 11,233,559 B2
(45) Date of Patent: Jan. 25, 2022

(54) FREQUENCY OFFSET ADJUSTMENT FOR BEAM SWITCHING IN WIRELESS COMMUNICATIONS

(71) Applicant: QUALCOMM Incorporated, San Diego, CA (US)

(72) Inventors: Michael Levitsky, Rehovot (IL); Ran Berliner, Kfar-Aviv (IL); Ori Auslender, San Diego, CA (US); Ruhua He, San Diego, CA (US); Ran Iron, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/703,552

(22) Filed: Dec. 4, 2019

(65) Prior Publication Data
US 2020/0186232 A1    Jun. 11, 2020

Related U.S. Application Data

(60) Provisional application No. 62/776,772, filed on Dec. 7, 2018.

(51) Int. Cl.
*H04B 7/08* (2006.01)
*H04B 7/06* (2006.01)
(Continued)

(52) U.S. Cl.
CPC .............. *H04B 7/088* (2013.01); *H04B 7/01* (2013.01); *H04B 7/0617* (2013.01);
(Continued)

(58) Field of Classification Search
CPC ........ H04B 7/088; H04B 7/01; H04B 7/0617; H04B 7/0695; H04B 16/28; H04B 24/10;
(Continued)

(56) References Cited

U.S. PATENT DOCUMENTS 9,036,538 B2    5/2015    Palanki
9,107,119 B2    8/2015    Appel
(Continued)

OTHER PUBLICATIONS

International Search Report and Written Opinion—PCT/US2019/064621—ISAEPO—dated Jun. 24, 2020.
(Continued)

*Primary Examiner* — Mewale A Ambaye
(74) *Attorney, Agent, or Firm* — Holland & Hart LLP

(57) ABSTRACT

Methods, systems, and devices for wireless communications are described that provide for adjustment of a frequency offset based on switching between uplink/downlink (UL/DL) transmission/reception beam pairs between a UE and a base station. A connection may be established via a first UL/DL transmission/reception beam pair and a frequency tracking loop may be established and maintained to correct for frequency error (e.g., due to Doppler shift) of received transmissions at a receiving device. In cases where a beam switch is performed, and the UE and base station switch from the first UL/DL transmission/reception beam pair to a second UL/DL transmission/reception beam pair, and a frequency offset difference between the first and second UL/DL transmission/reception beam pairs may be applied to the frequency tracking loop. The frequency offset difference may be obtained from a table of frequency offset measurements of multiple UL/DL beam pairs using associated reference signal transmissions.

30 Claims, 13 Drawing Sheets

(51) Int. Cl.
  *H04B 7/01*   (2006.01)
  *H04W 24/10*  (2009.01)
  *H04W 16/28*  (2009.01)

(52) U.S. Cl.
  CPC .......... *H04B 7/0695* (2013.01); *H04W 16/28* (2013.01); *H04W 24/10* (2013.01)

(58) Field of Classification Search
  CPC ...... H04B 7/0404; H04L 27/00; H04W 24/02; H04W 36/0083; H04W 72/046
  See application file for complete search history.

(56) References Cited

U.S. PATENT DOCUMENTS

| | | | |
|---|---|---|---|
| 9,451,652 B2 | 9/2016 | Gohari et al. | |
| 9,549,314 B2 | 1/2017 | Ode | |
| 2017/0367120 A1* | 12/2017 | Murray | H04B 7/0695 |
| 2018/0083719 A1* | 3/2018 | Kim | H04B 7/04 |
| 2018/0098248 A1* | 4/2018 | Torres | H04W 28/24 |
| 2018/0212698 A1 | 7/2018 | Sun et al. | |
| 2018/0241452 A1* | 8/2018 | Akkarakaran | H04L 5/0048 |
| 2019/0373640 A1* | 12/2019 | Sun | H04W 16/14 |
| 2021/0160804 A1* | 5/2021 | Akkarakaran | H04W 72/048 |

OTHER PUBLICATIONS

Intel Corporation: "Discussion on TRS", 3GPP Draft, 3GPP TSG RAN WG1 Meeting #90, R1-1712564 Discussion on TRS, 3rd Generation Partnership Project (3GPP), Mobile Competence Centre, 650, Route Des Lucioles, F-06921 Sophia-Antipolis Cedex, France, vol. RAN WG1, No. Prague, P.R. Czechia, Aug. 21, 2017-Aug. 25, 2017, Aug. 20, 2017 (Aug. 20, 2017), XP051315380, 3 pages, Retrieved from the Internet: URL: http://www.3gpp.org/ftp/Meetings_3GPP_SYNC/RAN1/Docs/. [retrieved on Aug. 20, 2017] chapter 2, p. 2-p. 3.
Intel Corporation: "Remaining Details on TRS", 3GPP Draft, 3GPP TSG RAN WG1 Meeting 91, R1-1720079, Remaining Details on TRS, 3rd Generation Partnership Project (3GPP), Mobile Competence Centre, 650, Route Des Lucioles, F-86921 Sophia-Antipolis Cedex, France, vol. RAN WG1, No. Reno, USA,Nov. 27, 2017-Dec. 1, 2017, Nov. 18, 2017 (Nov. 18, 2017), XP051369760, 4 pages, Retrieved from the Internet: URL: http://www.3gpp.org/ftp/tsg%5Fran/WG1%5FRL1/TSGR1%5F91/Docs/. [retrieved on Nov. 18, 2017]chapters 2.2 and 2.4, p. 2-p. 3.
Partial International Search Report—PCT/US2019/064621—ISA/EPO—dated Feb. 18, 2020.

* cited by examiner

|  | Tx_1 | Tx_2 | Tx_3 | ... | Tx_n |
|---|---|---|---|---|---|
| Rx_1 | FO(1,1) 520 | FO(2,1) 540 | FO(3,1) | ... | FO(n,1) |
| Rx_2 | FO(1,2) 530 | FO(2,2) | FO(3,2) 515 | ... | FO(n,2) |
| Rx_3 | FO(1,3) 525 | FO(2,3) 535 | FO(3,3) | ... | FO(n,3) |
| ... | ... | ... | ... | ... | ... |
| Rx_k | FO(1,k) | FO(2,k) | FO(3,k) | ... | FO(n,k) |

Columns grouped: 505-a, 505-b, 505-c, 505-n. Rows grouped: 510-a, 510-b, 510-c, 510-k.

500

FREQUENCY OFFSET ADJUSTMENT FOR BEAM SWITCHING IN WIRELESS COMMUNICATIONS

CROSS REFERENCE

The present Application for Patent claims the benefit of U.S. Provisional Patent Application No. 62/776,772 by LEVITSKY et al., entitled "FREQUENCY OFFSET ADJUSTMENT FOR BEAM SWITCHING IN WIRELESS COMMUNICATIONS," filed Dec. 7, 2018, assigned to the assignee hereof, and expressly incorporated herein.

BACKGROUND

The following relates generally to wireless communications, and more specifically to frequency offset adjustment for beam switching in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed or precoded signals for transmission and/or reception of wireless communications. For example, a base station may utilize beamformed or precoded transmissions to provide directional transmissions that may mitigate path losses that may be experienced by non-beamformed or non-precoded transmissions which may have a relatively wide beam or omnidirectional transmission pattern. Beamformed transmission beams using such techniques may result in relatively frequent switching of beams relative to non-beamformed transmissions, in order to maintain channel quality as a result of UE movement out of a directional beam path, other interference that may interfere with a particular beam, permissible exposure limits associated with one or more beams, or any combinations thereof. Efficient techniques for performing such beam switching with relatively little delay and relatively low signaling and processing overhead would be desirable in order to help enhance reliability and efficiency of a network utilizing beamforming.

SUMMARY

The described techniques relate to improved methods, systems, devices, and apparatuses that support frequency offset adjustment for beam switching in wireless communications. Various described techniques provide for adjustment of a frequency offset based on switching between uplink/downlink (UL/DL) transmission beam pairs used for communications between a UE and a base station. In some cases, the UE and base station may establish a connection via a first UL/DL transmission/reception beam pair and a frequency tracking loop may be established and maintained to correct for frequency error (e.g., due to Doppler shift or part-per-million (ppm) frequency offsets between transmit and receive sides) of received transmissions at a receiving device. In cases where a beam switch is performed, and the UE and base station switch from the first UL/DL transmission/reception beam pair to a second UL/DL transmission/reception beam pair, a frequency offset difference between the first and second UL/DL transmission/reception beam pairs may be applied to the frequency tracking loop.

In some cases, a receiving device, such as a UE, may measure a frequency offset for each of a number of UL/DL transmission/reception beam pairs. In some cases, the number of measurements may be stored in table entries associated with each of the number of measurements for the number of UL/DL transmission/reception beam pairs. In the event of a beam switch, the receiver may determine a frequency offset difference between the new UL/DL transmission/reception beam pair and the prior UL/DL transmission/reception beam pair. In some cases, the frequency offset for each UL/DL transmission/reception beam pair may be measured based on one or more reference signals associated with each UL/DL transmission/reception beam pair. Such reference signals may include, for example, a synchronization signal received in a synchronization signal block (SSB), a tracking reference signal (TRS), a channel state information reference signal (CSI-RS), a phase tracking reference signal (PTRS), a demodulation reference signal (DMRS), or any combination thereof. In some cases, a UE may measure frequency offsets for one or more downlink reference signals that are quasi-co-located (QCL) with one or more associated uplink transmission beams of one or more UL/DL transmission/reception beam pairs.

A method of wireless communications is described. The method may include establishing a wireless connection with a wireless node via a first UL/DL transmission/reception beam pair, determining a frequency offset difference between the first UL/DL transmission/reception beam pair and a second UL/DL transmission/reception beam pair, switching the wireless connection from the first UL/DL transmission/reception beam pair to the second UL/DL transmission/reception beam pair, and adjusting a frequency tracking loop for communications via the second UL/DL transmission/reception beam pair based on the determined frequency offset difference.

An apparatus for wireless communications is described. The apparatus may include a processor, memory in electronic communication with the processor, and instructions stored in the memory. The instructions may be executable by the processor to cause the apparatus to establish a wireless connection with a wireless node via a first UL/DL transmission/reception beam pair, determine a frequency offset difference between the first UL/DL transmission/reception beam pair and a second UL/DL transmission/reception beam pair, switch the wireless connection from the first UL/DL transmission/reception beam pair to the second UL/DL transmission/reception beam pair, and adjust a frequency tracking loop for communications via the second UL/DL transmission/reception beam pair based on the determined frequency offset difference.

Another apparatus for wireless communications is described. The apparatus may include means for establishing a wireless connection with a wireless node via a first UL/DL transmission/reception beam pair, determining a frequency offset difference between the first UL/DL transmission/reception beam pair and a second UL/DL transmission/reception beam pair, switching the wireless connection from the first UL/DL transmission/reception beam pair to the second UL/DL transmission/reception beam pair, and adjusting a frequency tracking loop for communications via the second UL/DL transmission/reception beam pair based on the determined frequency offset difference.

A non-transitory computer-readable medium storing code for wireless communications is described. The code may include instructions executable by a processor to establish a wireless connection with a wireless node via a first UL/DL transmission/reception beam pair, determine a frequency offset difference between the first UL/DL transmission/reception beam pair and a second UL/DL transmission/reception beam pair, switch the wireless connection from the first UL/DL transmission/reception beam pair to the second UL/DL transmission/reception beam pair, and adjust a frequency tracking loop for communications via the second UL/DL transmission/reception beam pair based on the determined frequency offset difference.

Some examples of the method, apparatuses, and non-transitory computer-readable medium described herein may further include operations, features, means, or instructions for measuring a set of frequency offsets associated with a set of UL/DL transmission/reception beam pairs, and storing each measured frequency offset in a table.

In some examples of the method, apparatuses, and non-transitory computer-readable medium described herein, the determining the frequency offset difference between the first UL/DL transmission/reception beam pair and the second UL/DL transmission/reception beam pair may include operations, features, means, or instructions for reading, from the table, a first measured frequency offset associated with the first UL/DL transmission/reception beam pair and a second measured frequency offset associated with the second UL/DL transmission/reception beam pair, where the first measured frequency offset may be a most recently updated frequency offset measurement associated with the first UL/DL transmission/reception beam pair, and subtracting the first measured frequency offset from the second measured frequency offset.

In some examples of the method, apparatuses, and non-transitory computer-readable medium described herein, the measuring the set of frequency offsets may be based on a reference signal transmitted via a downlink beam associated with each UL/DL transmission/reception beam pair of the set of UL/DL transmission/reception beam pairs. In some examples of the method, apparatuses, and non-transitory computer-readable medium described herein, the reference signal includes one or more of synchronization signals received in a synchronization signal block (SSB), a tracking reference signal (TRS), a channel state information reference signal (CSI-RS), a phase tracking reference signal (PTRS), a demodulation reference signal, or any combination thereof.

Some examples of the method, apparatuses, and non-transitory computer-readable medium described herein may further include operations, features, means, or instructions for updating, responsive to the switching the wireless connection, each of the measured frequency offsets in the table based on the determined frequency offset difference applied as an adjustment to a frequency tracking loop.

In some examples of the method, apparatuses, and non-transitory computer-readable medium described herein, the first UL/DL transmission/reception beam pair and the second UL/DL transmission/reception beam pair include serving beams for a UE, receive beams of the UE, transmit beams for the UE, or any combinations thereof. In some examples of the method, apparatuses, and non-transitory computer-readable medium described herein, the adjusting the frequency tracking loop includes applying a one-shot adjustment to the frequency tracking loop prior to an UL/DL transmission/reception via the second UL/DL transmission/reception beam pair.

In some examples of the method, apparatuses, and non-transitory computer-readable medium described herein, the adjusting the frequency tracking loop may be synchronized with a time for switching the wireless connection from the first UL/DL transmission/reception beam pair to the second UL/DL transmission/reception beam pair. In some examples of the method, apparatuses, and non-transitory computer-readable medium described herein, the time for switching the wireless connection may be determined at a UE or may be synchronized with beam switching at the wireless node based on a control transmission from the wireless node.

In some examples of the method, apparatuses, and non-transitory computer-readable medium described herein, a single frequency tracking loop may be used for a set of UL/DL transmission/reception beam pairs based on corresponding frequency offset differences associated with the set of UL/DL transmission/reception beam pairs. In some examples of the method, apparatuses, and non-transitory computer-readable medium described herein, a set of frequency offset differences may be maintained for a set of different UL/DL transmission/reception beam pairs for application to a single frequency tracking loop.

In some examples of the method, apparatuses, and non-transitory computer-readable medium described herein, the determining the frequency offset difference may include operations, features, means, or instructions for receiving a first reference signal via a first DL transmission/reception beam pair that is quasi-co-located (QCL) with a first uplink transmission/reception beam pair, determining a first frequency offset associated with the first reference signal based on a current state of the frequency tracking loop and a first measured frequency of the first reference signal, receiving a second reference signal via a second DL transmission/reception beam pair that is QCL with a second uplink transmission/reception beam pair, determining a second frequency offset associated with the second reference signal based on the current state of the frequency tracking loop and a second measured frequency of the second reference signal, and determining the frequency offset difference based on a difference between the first frequency offset and the second frequency offset.

In some examples of the method, apparatuses, and non-transitory computer-readable medium described herein, the first UL/DL transmission/reception beam pair and the second UL/DL transmission/reception beam pair include beamformed millimeter wave transmission beams or non-beamformed lower frequency beams. In some examples of the method, apparatuses, and non-transitory computer-readable medium described herein, the first UL/DL transmission/reception beam pair may be associated with a first cell, and the second UL/DL transmission/reception beam pair may be associated with a second cell, and where the switching corresponds to a handover operation between the first cell and the second cell.

Another method of wireless communications is described. The method may include establishing a wireless connection with a first wireless node via a first UL/DL transmission/reception link with a first cell, initiating a single frequency tracking loop for communications via the first UL/DL transmission/reception link, determining a frequency offset difference between the first UL/DL transmission/reception link and a second UL/DL transmission/reception link with a second cell, switching, responsive to a handover command, the wireless connection from the first UL/DL transmission/reception link to the second UL/DL transmission/reception link, and adjusting the single frequency tracking loop for use in communications via the second UL/DL transmission/reception link based at least in part on the determined frequency offset difference.

An apparatus for wireless communications is described. The apparatus may include a processor, memory in electronic communication with the processor, and instructions stored in the memory. The instructions may be executable by the processor to cause the apparatus to establish a wireless connection with a first wireless node via a first UL/DL transmission/reception link with a first cell, initiate a single frequency tracking loop for communications via the first UL/DL transmission/reception link, determine a frequency offset difference between the first UL/DL transmission/reception link and a second UL/DL transmission/reception link with a second cell, switch, responsive to a handover command, the wireless connection from the first UL/DL transmission/reception link to the second UL/DL transmission/reception link, and adjust the single frequency tracking loop for use in communications via the second UL/DL transmission/reception link based at least in part on the determined frequency offset difference.

Another apparatus for wireless communications is described. The apparatus may include means for establishing a wireless connection with a first wireless node via a first UL/DL transmission/reception link with a first cell, initiating a single frequency tracking loop for communications via the first UL/DL transmission/reception link, determining a frequency offset difference between the first UL/DL transmission/reception link and a second UL/DL transmission/reception link with a second cell, switching, responsive to a handover command, the wireless connection from the first UL/DL transmission/reception link to the second UL/DL transmission/reception link, and adjusting the single frequency tracking loop for use in communications via the second UL/DL transmission/reception link based at least in part on the determined frequency offset difference.

A non-transitory computer-readable medium storing code for wireless communications is described. The code may include instructions executable by a processor to establish a wireless connection with a first wireless node via a first UL/DL transmission/reception link with a first cell, initiate a single frequency tracking loop for communications via the first UL/DL transmission/reception link, determine a frequency offset difference between the first UL/DL transmission/reception link and a second UL/DL transmission/reception link with a second cell, switch, responsive to a handover command, the wireless connection from the first UL/DL transmission/reception link to the second UL/DL transmission/reception link, and adjust the single frequency tracking loop for use in communications via the second UL/DL transmission/reception link based at least in part on the determined frequency offset difference.

In some examples of the method, apparatuses, and non-transitory computer-readable medium described herein, the first UL/DL transmission/reception link and the second UL/DL transmission/reception link are non-beamformed links. In some examples of the method, apparatuses, and non-transitory computer-readable medium described herein, the determining the frequency offset difference may include operations, features, means, or instructions for measuring a plurality of frequency offsets associated with a plurality of cells, and storing each measured frequency offset in a table. In some examples of the method, apparatuses, and non-transitory computer-readable medium described herein, the determining the frequency offset difference may include operations, features, means, or instructions for updating, responsive to completing the handover command, each of the measured frequency offsets in the table based at least in part on the determined frequency offset difference applied as an adjustment to the frequency tracking loop. In some examples of the method, apparatuses, and non-transitory computer-readable medium described herein, the adjusting the single frequency tracking loop comprises applying a one-shot adjustment to the single frequency tracking loop prior to an UL/DL transmission/reception via the second UL/DL transmission/reception link.

DETAILED DESCRIPTION

Figure 1:
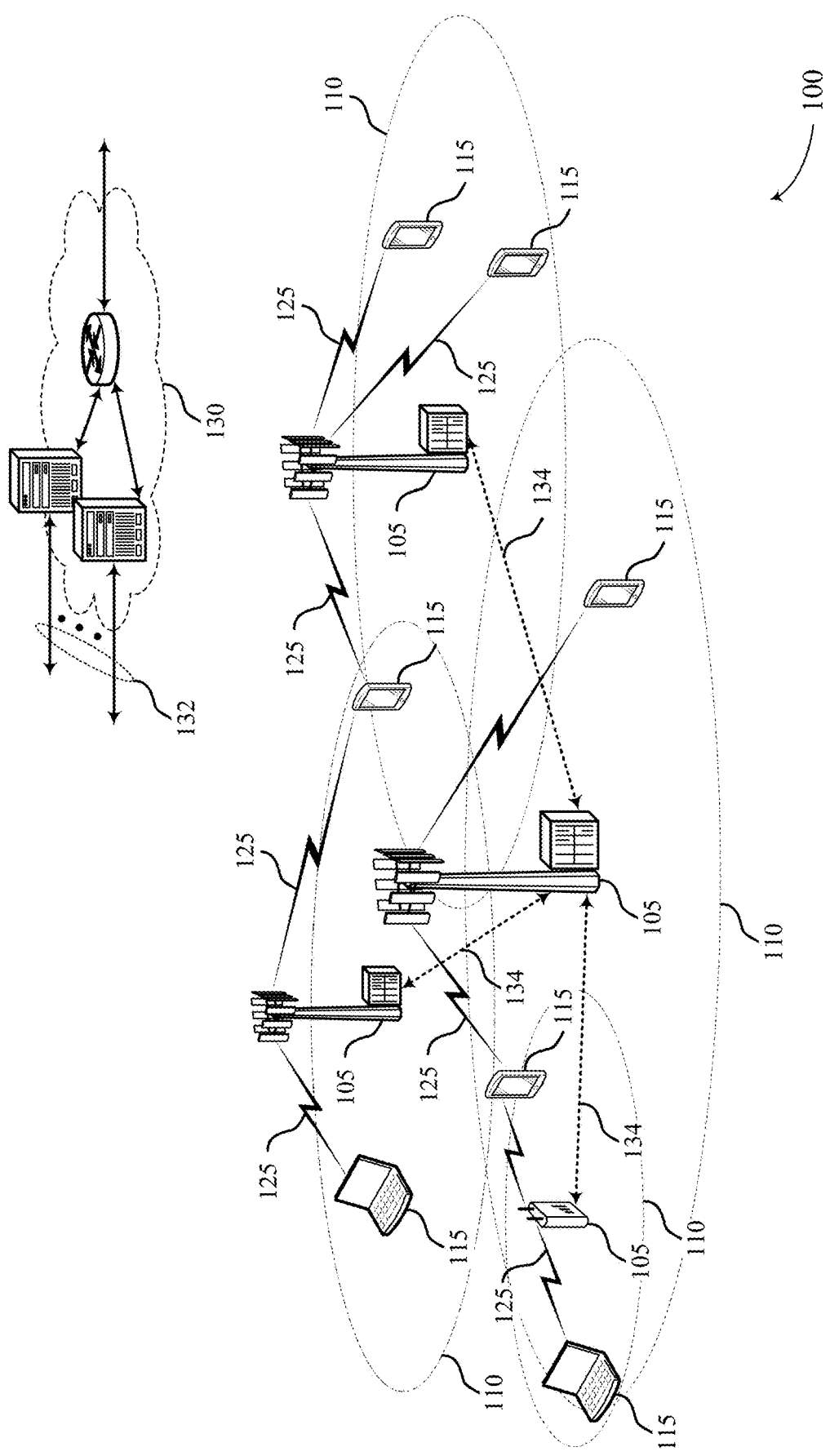
FIG. 1 illustrates an example of a system for wireless communications that supports frequency offset adjustment for beam switching in wireless communications in accordance with aspects of the present disclosure.

Various aspects of the present disclosure relate to methods, systems, devices, and apparatuses that support frequency offset adjustment in beamformed wireless communications. Described techniques provide for adjustment of a frequency offset when switching transmission beams. In some cases, the frequency offset adjustment may be a one-shot frequency adjustment to a frequency tracking loop. In some cases, a user equipment (UE) and a base station may establish a connection using a first uplink/downlink (UL/DL) transmission beam pair, and the frequency tracking loop may be established and maintained to correct for frequency error (e.g., due to Doppler shift) of received transmissions at a receiving device. A beam switch may be performed, and the UE and base station switch from the first UL/DL transmission/reception beam pair to a second UL/DL transmission/reception beam pair, and a frequency offset difference between the first and second UL/DL transmission/reception beam pairs may be applied to the frequency tracking loop. In some cases, the UE may use a single frequency tracking loop for a number of UL/DL transmission/reception beam pairs, based on corresponding frequency offset differences associated with the number of UL/DL transmission/reception beam pairs.

In some cases, a receiving device, such as a UE, may measure a frequency offset for each of a number of UL/DL transmission/reception beam pairs. In some cases, the number of measurements may be stored in table entries associated with each of the number of measurements for the number of UL/DL transmission/reception beam pairs. In the event of a beam switch, the receiver may determine a frequency offset difference between the new UL/DL transmission/reception beam pair and the prior UL/DL transmission/reception beam pair. In some cases, the frequency offset for each UL/DL transmission/reception beam pair may be measured based on one or more reference signals associated with each UL/DL transmission/reception beam pair. Such reference signals may include, for example, a synchronization signal received in a synchronization signal block (SSB), a tracking reference signal (TRS), a channel state information reference signal (CSI-RS), a phase tracking reference signal (PTRS), a demodulation reference signal (DMRS), or any combination thereof. In some cases, a UE may measure frequency offsets for one or more downlink reference signals that are quasi-co-located (QCL) with one or more associated uplink transmission beams of one or more UL/DL transmission/reception beam pairs.

In some cases, the adjustment of the frequency tracking loop may be synchronized with a time for switching the wireless connection from the first UL/DL transmission/reception beam pair to the second UL/DL transmission/reception beam pair (e.g., based on a medium access control (MAC) control element (CE), radio resource control signaling, or downlink control information transmitted from the base station to the UE). In some cases, a UL/DL transmission/reception beam pair may be referred to as a serving beam, and may be associated with a single active transmission configuration indicator (TCI) state or two or more serving beams may be used concurrently in cases where multiple active TCI states are present. In some cases, the transmission beams of the UL/DL transmission/reception beam pairs may be beamformed millimeter wave (mmW) transmission beams, which may correspond to frequency range two (FR2) transmissions in some NR systems. In other cases, the transmission beams may be non-beamformed or precoded lower frequency beams, which may correspond to frequency range one (FR1) transmissions in some NR systems. Additionally or alternatively, the first UL/DL transmission/reception beam pair may be associated with a first cell, and the second UL/DL transmission/reception beam pair may be associated with a second cell, and the switching between the transmission beam pairs may correspond to a handover operation between the first cell and the second cell.

Such frequency offset adjustments may allow UEs to efficiently and quickly adjust frequency tracking loops for communications with a base station in the event of a beam change. Accordingly, techniques such as discussed herein may allow for beam switching with relatively little delay and relatively low signaling and processing overhead, as the adjustment to the frequency tracking loop may be made simultaneously with a beam switch. Such techniques may thus help enhance reliability and efficiency of a network utilizing beamforming. Further, techniques discussed herein may allow a UE to store different frequency offset measurements for different UL/DL transmission/reception beam pairs, which may allow the UE use different UL/DL transmission/reception beam pairs (e.g., according to multiple configured TCI states) with a single frequency tracking loop.

Aspects of the disclosure are initially described in the context of exemplary wireless communications systems. Aspects of the disclosure are further illustrated by and described with reference to apparatus diagrams, system diagrams, and flowcharts that relate to frequency offset adjustment for beam switching in wireless communications.

FIG. 1 illustrates an example of a wireless communications system 100 that supports frequency offset adjustment for beam switching in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Base stations 105 and UEs 115 may use, in some cases, UL/DL transmission/reception beam pairs for communications, and one or more measured frequency offsets for multiple UL/DL transmission/reception beam pairs may be used to provide frequency correction when switching between UL/DL transmission/reception beam pairs.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI).

In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, 50, 80, 100, 200, or 400 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, base stations 105 and UEs 115 may use beamformed transmission beams for communication, and frequency offset adjustments may be performed when switching between different UL/DL transmission/reception beam pairs. In some cases, a UE 115 and a base station 105 may establish a connection via a first UL/DL transmission/reception beam pair, and a frequency tracking loop may be established and maintained to correct for frequency error (e.g., due to Doppler shift or ppm frequency offsets between transmit and receive sides) of received transmissions via the first UL/DL transmission/reception beam pair. A beam switch may be performed, and the UE 115 and base station 105 may switch from the first UL/DL transmission/reception beam pair to a second UL/DL transmission/reception beam pair, and a frequency offset difference between the first and second UL/DL transmission/reception beam pairs may be applied to the frequency tracking loop for subsequent communications that use the second UL/DL transmission/reception beam pair. Such frequency offset differences may also be applied in cases where a UE 115 may switch a receive beam in DL or transmit beam in UL while the base station 105 maintains a same downlink transmission beam or UL reception beam accordingly (e.g., due to UE beam tracking procedures or maximum permissible exposure (MPE) regulation related limitations). Additionally, such frequency offset differences may be applied in cases where DL and UL beam pairs are not the same (i.e., are not reciprocal beams that use beam reciprocity for one or more beamforming parameters), and UL beam pairs switching may take place independently of the corresponding DL beams pair switching.

Figure 2:
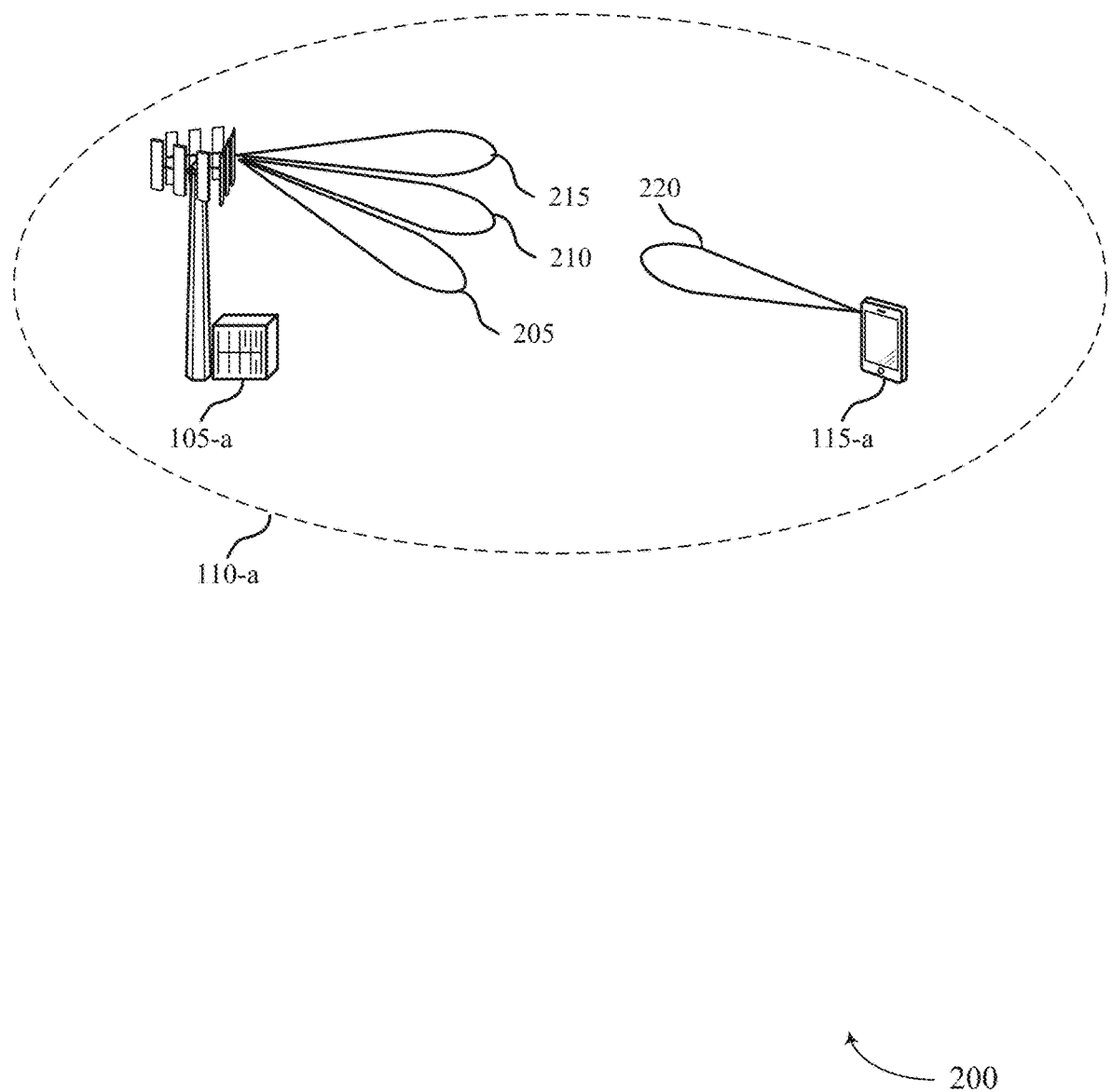
FIG. 2 illustrates an example of a portion of a wireless communications system that supports frequency offset adjustment for beam switching in wireless communications in accordance with aspects of the present disclosure.

FIG. 2 illustrates an example of a wireless communications system 200 that supports frequency offset adjustment for beam switching in wireless communications in accordance with aspects of the present disclosure. In some examples, wireless communications system 200 may implement aspects of wireless communications system 100. The wireless communications system 200 may include base station 105-a and UE 115-a, which may be examples of a base station 105 and a UE 115, as described with reference to FIG. 1.

Base station 105-a may provide network coverage for geographic area 110-a. Base station 105-a and UE 115-a may communicate using beamformed or directional transmissions, and non-beamformed transmissions. For example, in downlink communications, base station 105-a may transmit downlink transmissions to UE 115-a using a beamformed downlink transmission beam 210, which may be one of a number of downlink transmission beams used by the base station 105-a, such as other downlink transmission beams 205 and 215. The UE 115-a may transmit uplink transmissions to the base station 105-a using a beamformed uplink transmission beam 220. In cases where communications are established using the downlink transmission beam 210 and uplink transmission beam 220, such transmission beams may be a UL/DL transmission/reception beam pair, which may also be referred to as a serving beam. The UE 115-a may use beamforming parameters associated with the serving beam to configure receive hardware for receiving downlink transmissions from the base station 105-a, and also to configure transmit hardware for uplink transmissions to the base station 105-a.

In some cases, a second UL/DL transmission/reception beam pair may be associated with a second downlink beam 205 and the uplink transmission beam 220, and a third UL/DL transmission/reception beam pair may be associate with a third downlink beam 215 and the uplink transmission beam 220. In non-static scenarios, the UE 115-a may be in motion relative to the base station 105-a, and a serving beam (e.g., a UL/DL transmission/reception beam pair) may be switched based on an initiation by the base station 105-a, or only a receive beam may be switched autonomously by the UE 115-a (e.g., for receive beam tracking), or an uplink transmit beam may be autonomously switched by the UE 115-a, such as to comply with MPE limitations. Further, in cases where relatively narrow beams are used, relatively frequent beam switches may be performed to preserve a communications link between the UE 115-a and the base station 105-a.

In some cases, different UL/DL transmission/reception beam pairs used for the communications link result in different channel paths captured on the receive side coming from different spatial directions. As indicated, in cases where the UE 115-a is moving relative to the base station 105-a, relatively frequent beam switches may occur. Further, in such cases, Doppler behavior of the channel will be mainly characterized by the corresponding Doppler shift, resulting in frequency error at the receiving side. Since Doppler shift is in general dependent on direction of arrival via a relative angle between the direction of UE 115-a movement and direction of signal arrival (θ angle in the following expression:

$$f_D = \frac{v \cdot f_c}{c} \cos(\theta))$$

at the base station 105-a, every beam switch may result in a different Doppler shift and equivalently may cause frequency error variations up to ±2$f_D$ upon beam switch. Additionally, when using OFDM-based transmissions, frequency error on receiver side will cause inter-carrier interference (ICI) that may not be correctable without substantial UE 115-a processing, and thus some signal-to-noise ratio (SNR) degradation may be introduced. The UE 115-*a*, in some cases, may use a frequency tracking loop to compensate for frequency errors, and ICI may be present until the frequency tracking loop converges to a given frequency offset after every beam switch. Further, convergence time of the frequency tracking loop will be limited by pilot signal or reference signal periodicity.

As indicated above, in some cases the UE 115-*a*, may perform an adjustment of a frequency offset when switching transmission beams which may allow the frequency tracking loop to more accurately compensate for frequency offset differences between different UL/DL transmission/reception beam pairs. In some cases, the frequency offset adjustment may be a one-shot frequency adjustment to the frequency tracking loop to correct for frequency error (e.g., due to Doppler shift) of received transmissions.

In some cases, a receiving device, such as UE 115-*a*, may measure a frequency offset for each of a number of UL/DL transmission/reception beam pairs. In some cases, the number of measurements may be stored in table entries associated with each of the number of measurements for the number of UL/DL transmission/reception beam pairs. In the event of a beam switch, the UE 115-*a* may determine a frequency offset difference between the new UL/DL transmission/reception beam pair and the prior UL/DL transmission/reception beam pair. In some cases, the frequency offset for each UL/DL transmission/reception beam pair may be measured based on one or more reference signals associated with each UL/DL transmission/reception beam pair. Such reference signals may include, for example, a synchronization signal received in a SSB, a TRS, a CSI-RS, a PTRS, a DMRS, or any combinations thereof. In some cases, the UE 115-*a* may measure frequency offsets for one or more downlink reference signals that are quasi-co-located (QCL) with one or more associated uplink transmission beams of one or more UL/DL transmission/reception beam pairs.

In some cases, such techniques may be used to provide frequency offset adjustment for multiple beams using a single tracking loop at the UE 115-*a*. In some cases, frequency offset adjustment can be done on different beams used for uplink and downlink at the same time (i.e., no beam correspondence) while having single tracking loop. Further, while various examples are discussed in which UL/DL transmission/reception beam pairs use mmW frequencies, such techniques are also applicable to lower frequencies. Additionally or alternatively, frequency offset adjustment techniques as provided herein may be used in cases where a communications link is subject to a handover procedure between two cells, where the cells are synchronized in terms of parts-per-million (ppm) frequency offset. In such handover cases, the UE 115-*a* may maintain relative frequency offset measurements for one or more monitored neighbor cells (e.g., between the serving beam/SSB of the current serving cell and an identified beam/SSB of one or more neighbor cells).

Figure 3:
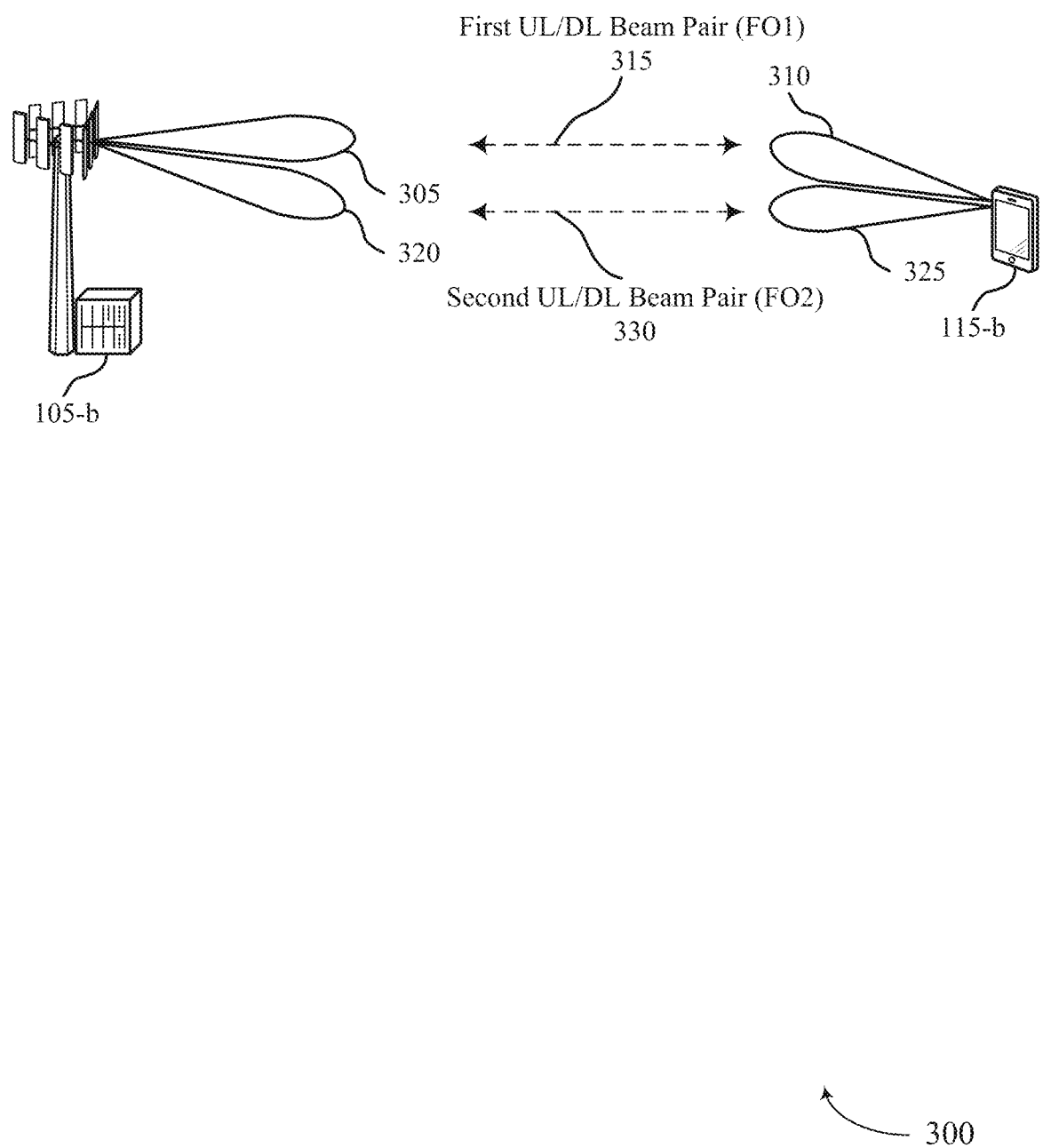
FIG. 3 illustrates another example of a portion of wireless communications system that supports frequency offset adjustment for beam switching in wireless communications in accordance with aspects of the present disclosure.

FIG. 3 illustrates another example of a wireless communications system 300 that supports frequency offset adjustment for beam switching in wireless communications in accordance with aspects of the present disclosure. In some examples, wireless communications system 300 may implement aspects of wireless communications system 100 or 200. The wireless communications system 300 may include base station 105-*b* and UE 115-*b*, which may be examples of a base station 105 and a UE 115, as described above.

Base station 105-*b* and UE 115-*b* may initially communicate using beamformed or directional transmissions via first downlink beam 305 and first uplink beam 310, which may form a first UL/DL beam pair 315. At some point in time after establishing a communications link using the first UL/DL beam pair 315, it may be determined that a beam switch is to be performed (e.g., based on channel conditions of the first downlink beam 305 and first uplink beam 310), and the UE 115-*b* and base station 105-*b* may switch to use second downlink beam 320 and second uplink beam 325, which may form a second UL/DL beam pair 330. For example, a vehicle or piece of equipment may move to be located between the UE 115-*b* and the base station 105-*b* and block the first UL/DL beam pair 315. In this example, the first UL/DL beam pair 315 may have a first frequency offset (FO1). In some cases, the first frequency offset may be zero, such as where the frequency tracking loop at the UE 115-*b* has converged, or may be a relatively small non-zero offset in cases where the frequency tracking loop has not converged following a most recent frequency measurement of the first UL/DL beam pair 315. In some cases, the most recent measured frequency offset value for the first UL/DL beam pair 315 may be used as the first frequency offset.

In some cases, the UE 115-*b* and base station 105-*b* may have a number of different UL/DL beam pairs (which may be referred to as BPLs in some cases) that are available for potential beam switches. In the example of FIG. 3, such different UL/DL beam pairs may include the second UL/DL beam pair 330. In some cases, in advance of the beam switch, the UE 115-*b* may determine a frequency offset for some or all of the different UL/DL beam pairs, including a second frequency offset (FO2) of the second UL/DL beam pair 330. In some cases, the frequency offsets for the number of different UL/DL beam pairs may be measured based on a reference signal that is transmitted by the base station 105-*b* in a downlink beam that is QCLed with the corresponding DL beam, which in turn has spatial relation with the corresponding UL beam. In some cases, the reference signal used to measure frequency offset for the UL/DL beam pairs may include a synchronization signal in a SSB, a PTRS, a TRS, a CSI-RS, a DMRS, or any combinations thereof. This difference in frequency offsets may be applied to the frequency tracking loop at the time of the beam switch, in order to provide an adjustment to the frequency tracking loop at the UE 115-*b* upon beam switching from the first BPL to the second BPL. For example, the first frequency offset may be subtracted from the second frequency offset (e.g., FO2−FO1), and the resulting difference may be applied autonomously by the UE 115-*b* as a one-shot frequency adjustment to the frequency tracking loop at the UE 115-*b*. Thus efficient frequency offset adjustments with no or little signaling overhead may be made at the UE 115-*b* when beams are switched.

Figure 4:
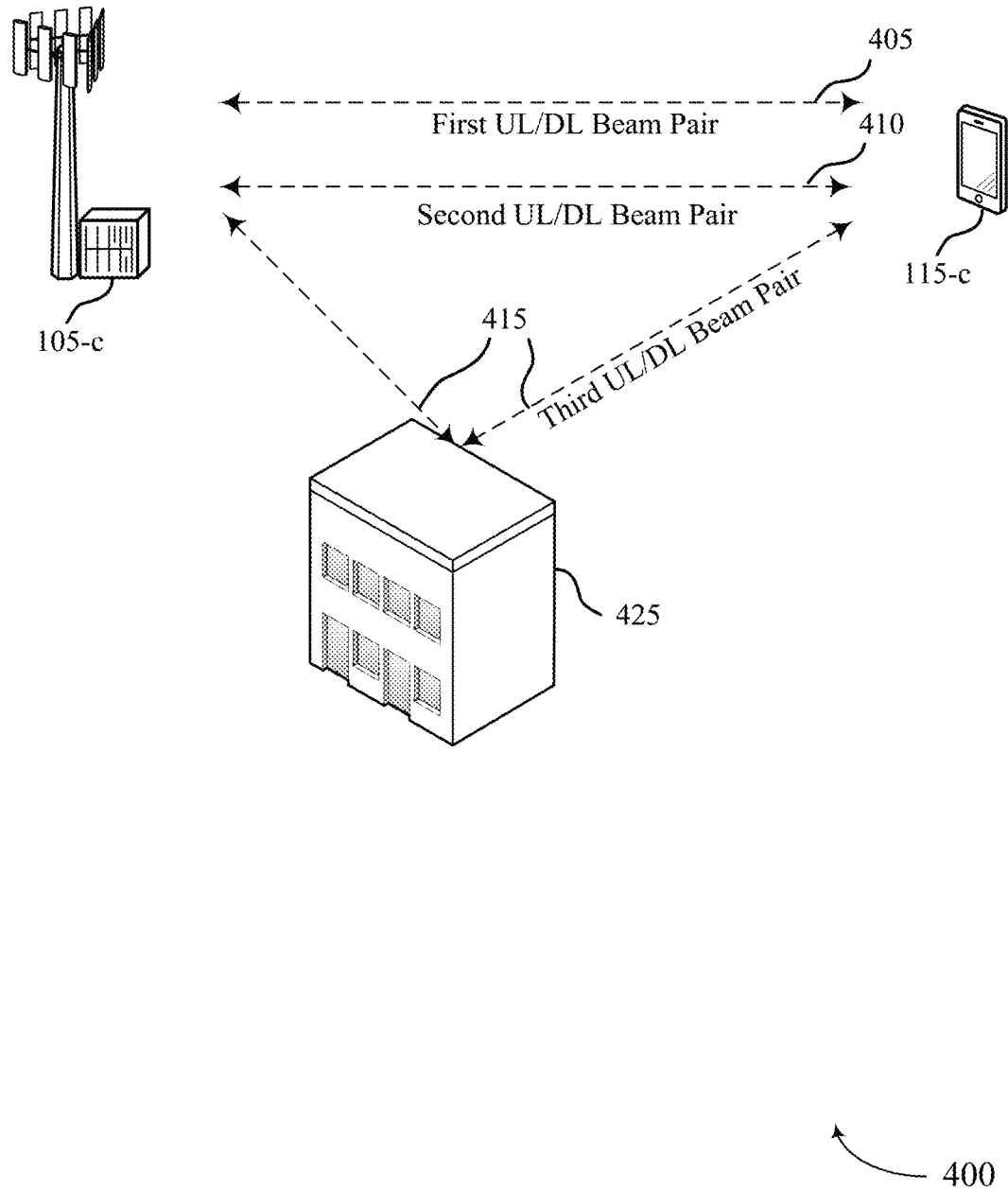
FIG. 4 illustrates another example of a portion of a wireless communications system that supports frequency offset adjustment for beam switching in wireless communications in accordance with aspects of the present disclosure.

FIG. 4 illustrates an example of a wireless communications system 400 that supports frequency offset adjustment for beam switching in wireless communications in accordance with aspects of the present disclosure. In some examples, wireless communications system 400 may implement aspects of wireless communications system 100, 200, or 300. The wireless communications system 400 may include base station 105-*c* and UE 115-*c*, which may be examples of a base station 105 and a UE 115, as described above.

Similarly as discussed above, base station 105-*c* and UE 115-*c* may use beamformed transmissions for communications. In this example, different uplink channels and different downlink channels may use different transmission beams based on multiple TCIs that may be configured at the UE 115-*c*. For example, a first UL/DL beam pair 405 may be used to transmit PDSCH or broadcast transmissions, and a second UL/DL beam pair 410 may be used to transmit PDCCH transmissions to the UE. Each of the PDSCH and PDCCH transmissions may have a different frequency offset based on the different UL/DL beam pairs, in this example. The UE 115-c, in this example, may maintain a frequency offset measurement associated with each of the first UL/DL beam pair 405 and the second UL/DL beam pair 410, and may apply a difference in the frequency offsets to a single frequency tracking loop upon beam switch.

Additionally, a third UL/DL beam pair 415 may be available in this example, and the UE 115-c may determine a frequency offset associated with the third UL/DL beam pair 415 based on downlink reference signals that are QCL with the third UL/DL beam pair 415. In this example, the third UL/DL beam pair 415 may have a non-line-of-sight (non-LOS) path due to a reflection off of building 425, and thus may have a different frequency offset compared to the first UL/DL beam pair 405 and the second UL/DL beam pair 410. In the event of a beam switch to the third UL/DL beam pair 415, the UE 115-c may use the measured frequency offset of the third UL/DL beam pair 415 to determine a frequency offset difference to be applied to the frequency tracking loop.

Figure 5:
FIG. 5 illustrates an example of a frequency offset measurement table that supports frequency offset adjustment for beam switching in wireless communications in accordance with aspects of the present disclosure.

FIG. 5 illustrates an example of a frequency offset measurement table 500 that supports frequency offset adjustment for beam switching in wireless communications in accordance with aspects of the present disclosure. In some examples, frequency offset measurement table 500 may be used to implement aspects of wireless communications system 100, 200, 300, or 400. As discussed herein, in some cases a UE (e.g., a UE 115) may measure a frequency offset for a number of different UL/DL transmission/reception beam pairs. Such measurements may be based on monitored reference signals (e.g., reference signals in a SSB, TRS, CSI-RS, PTRS, a DMRS, or any combinations thereof) that are transmitted from a base station (e.g., a base station 105). The phrase 'reading from a table' herein refers to electronically accessing stored tabular information, such as illustrated in the example of FIG. 5, to identify one or more values included in the tabular information.

The frequency offset measurement table 500 of this example may include a number of columns 505 that may each correspond to a different transmit beam, and a number of rows 510 that may each correspond to a different receive beam. The different transmit beams may correspond to transmit beams that are used to transmit one or more different reference signals QCLed with these beams that are received from a base station. Likewise, the different receive beams may correspond to receive beams that are coupled with different transmit beams in DL that carry one or more reference signals QCLed with different transmit beams that are received from a base station. Thus, each entry in the frequency offset measurement table 500 may correspond to a combination of a transmit beam and a receive beam and indicate the associated specific transmit and receive beam pair frequency offset measurement relative to the frequency tracking loop state at the time of the measurement. In the event of a beam switch, the frequency offset difference between a prior transmit/receive beam pair in UL/DL and a new transmit/receive beam pair in UL/DL may be based on a difference in the frequency offset measurements recorded in frequency offset measurement table 500. In the example of FIG. 5, entries are indicated based on the following convention FO(Tx_ID, Rx_ID).

In some cases, each time a DL serving beam is switched (i.e., a transmit/receive beam pair change), or only DL receive beam is switched, and the frequency tracking loop is adjusted, the corresponding entries in frequency offset measurement table 500 are updated with the beam switch frequency offset correction. In some cases, the differential correction that is used to move the frequency tracking loop state changes the loop reference point, and thus all the measurements in the frequency offset measurement table 500 are updated accordingly with the loop state change.

As indicated, in the event of a beam switch, the entries of the frequency offset measurement table 500 may be used to determine a frequency offset adjustment. For example, a serving beam switch from a first UL/DL beam pair that includes beams Tx_1 and Rx_1 to a second UL/DL beam pair that includes beams Tx_3 and Rx_2 may be indicated to the UE (e.g., via a MAC-CE received from the base station). The UE may determine a frequency offset adjustment based on measured frequency offsets which, in this example, may be determined by subtracting FO(1, 1) 520 (i.e., the most recent frequency offset measurement for the first UL/DL beam pair) from FO(3, 2) 515 (i.e., the frequency offset measurement for the second UL/DL beam pair). Thus, such a serving beam switch in DL from Tx_1+Rx_1 beam pair to Tx_3+Rx_2 beam pair will involve the frequency adjustment: FO(3,2)−FO(1,1).

In other examples, the UE may perform receive beam switching, based on UE receive beam tracking. In such a case, the serving transmit beam in downlink may be Tx_1, and the receive beam may switch from Rx_2 to Rx_3. The corresponding entries in frequency offset measurement table 500 may be recorded at FO(1, 2) 530 and FO(1, 3) 525. In such a case, the frequency offset adjustment for the beam switch is determined based on: FO(1, 3)−FO(1, 2).

In other examples, the UE may switch uplink beams, such as in the event that an MPE limit is reached and the UE needs to switch transmit beams. In such an example, the serving transmit beam in downlink may be Tx_2, and UE transmit beam switch in the uplink is equivalent to a UE receive beam switch in downlink, due to beam reciprocity. In this case, the corresponding switching is thus from the UE transmit beam corresponding to Rx_1 (i.e., FO(2, 1) 540) to a UE Tx beam corresponding to Rx_3 (i.e., FO(2, 3) 535) will involve the following frequency adjustment: FO(2, 3)−FO(2, 1).

Figure 6:
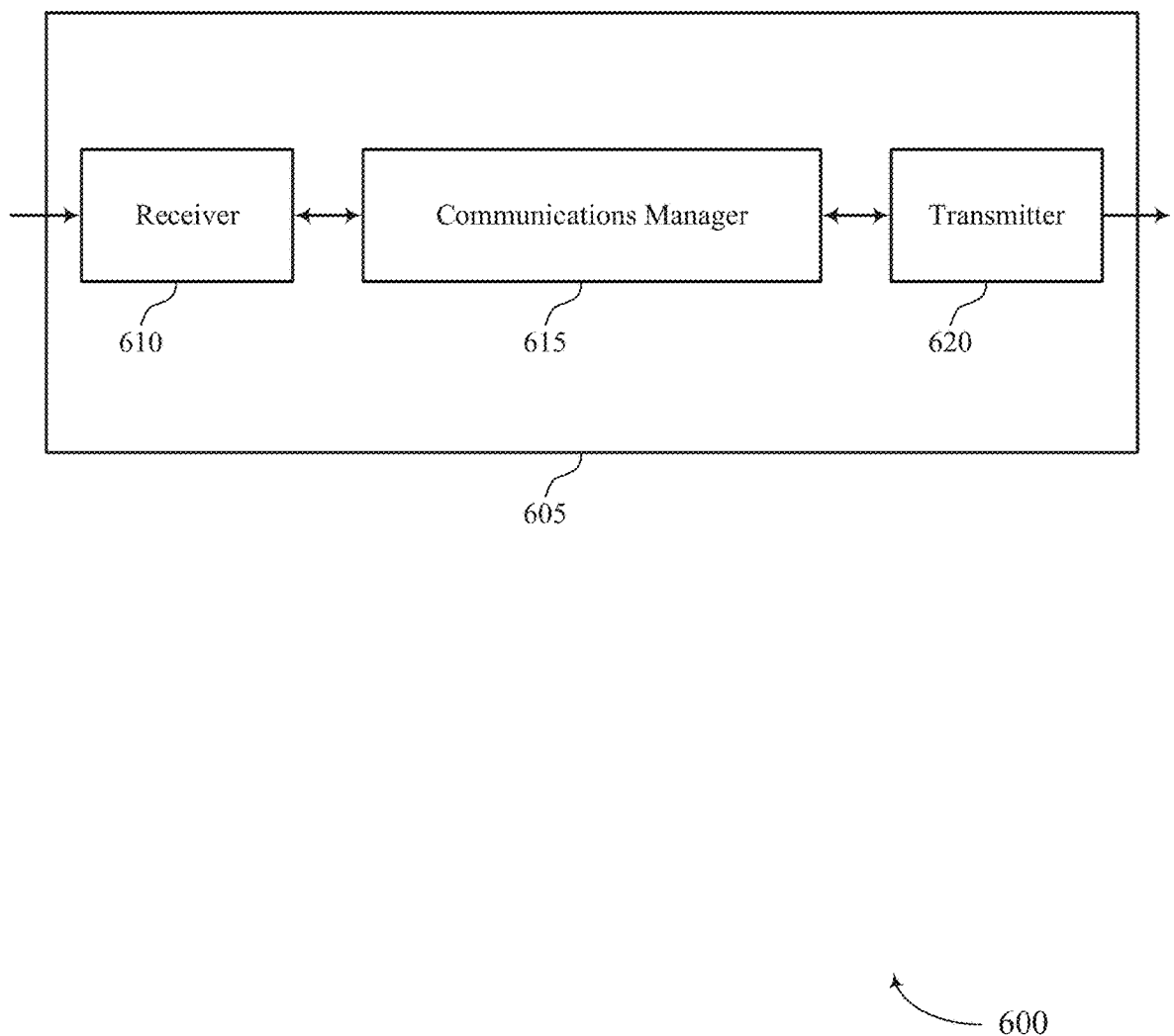
FIGS. 6 and 7 show block diagrams of devices that support frequency offset adjustment for beam switching in wireless communications in accordance with aspects of the present disclosure.

FIG. 6 shows a block diagram 600 of a device 605 that supports frequency offset adjustment for beam switching in wireless communications in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to frequency offset adjustment for beam switching in wireless communications, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may establish a wireless connection with a wireless node via a first UL/DL transmission/reception beam pair, determine a frequency offset difference between the first UL/DL transmission/reception beam pair and a second UL/DL transmission/ reception beam pair, adjust a frequency tracking loop for communications via the second UL/DL transmission/reception beam pair based on the determined frequency offset difference, and switch the wireless connection from the first UL/DL transmission/reception beam pair to the second UL/DL transmission/reception beam pair. The communications manager 615 may be an example of aspects of the communications manager 910 or 1010 as described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
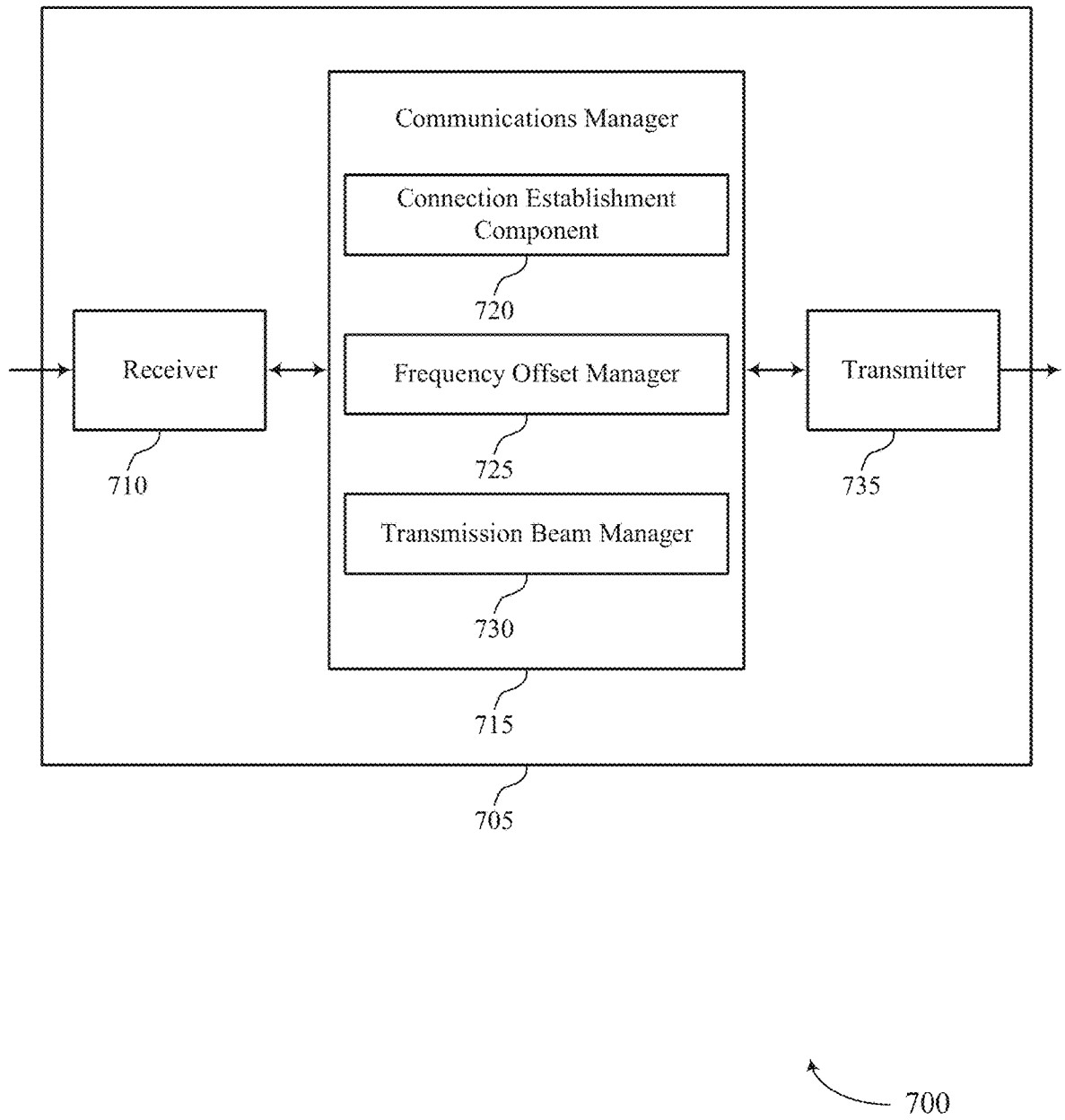

FIG. 7 shows a block diagram 700 of a device 705 that supports frequency offset adjustment for beam switching in wireless communications in accordance with aspects of the present disclosure. The device 705 may be an example of aspects of a device 605, a UE 115, or a base station 105 as described herein. The device 705 may include a receiver 710, a communications manager 715, and a transmitter 735. The device 705 may also include a processor. Each of these components may be in communication with one another (e.g., via one or more buses).

Receiver 710 may receive information such as packets, user data, or control information associated with various information channels (e.g., control channels, data channels, and information related to frequency offset adjustment for beam switching in wireless communications, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a connection establishment component 720, a frequency offset manager 725, and a transmission beam manager 730. The communications manager 715 may be an example of aspects of the communications manager 910 or 1010 as described herein.

The connection establishment component 720 may establish a wireless connection with a wireless node via a first UL/DL transmission/reception beam pair.

The frequency offset manager 725 may determine a frequency offset difference between the first UL/DL transmission/reception beam pair and a second UL/DL transmission/reception beam pair and adjust a frequency tracking loop for communications via the second UL/DL transmission/reception beam pair based on the determined frequency offset difference.

The transmission beam manager 730 may switch the wireless connection from the first UL/DL transmission/reception beam pair to the second UL/DL transmission/reception beam pair.

Transmitter 735 may transmit signals generated by other components of the device 705. In some examples, the transmitter 735 may be collocated with a receiver 710 in a transceiver module. For example, the transmitter 735 may be an example of aspects of the transceiver 920 or 1020 as described with reference to FIGS. 9 and 10. The transmitter 735 may utilize a single antenna or a set of antennas.

Figure 8:
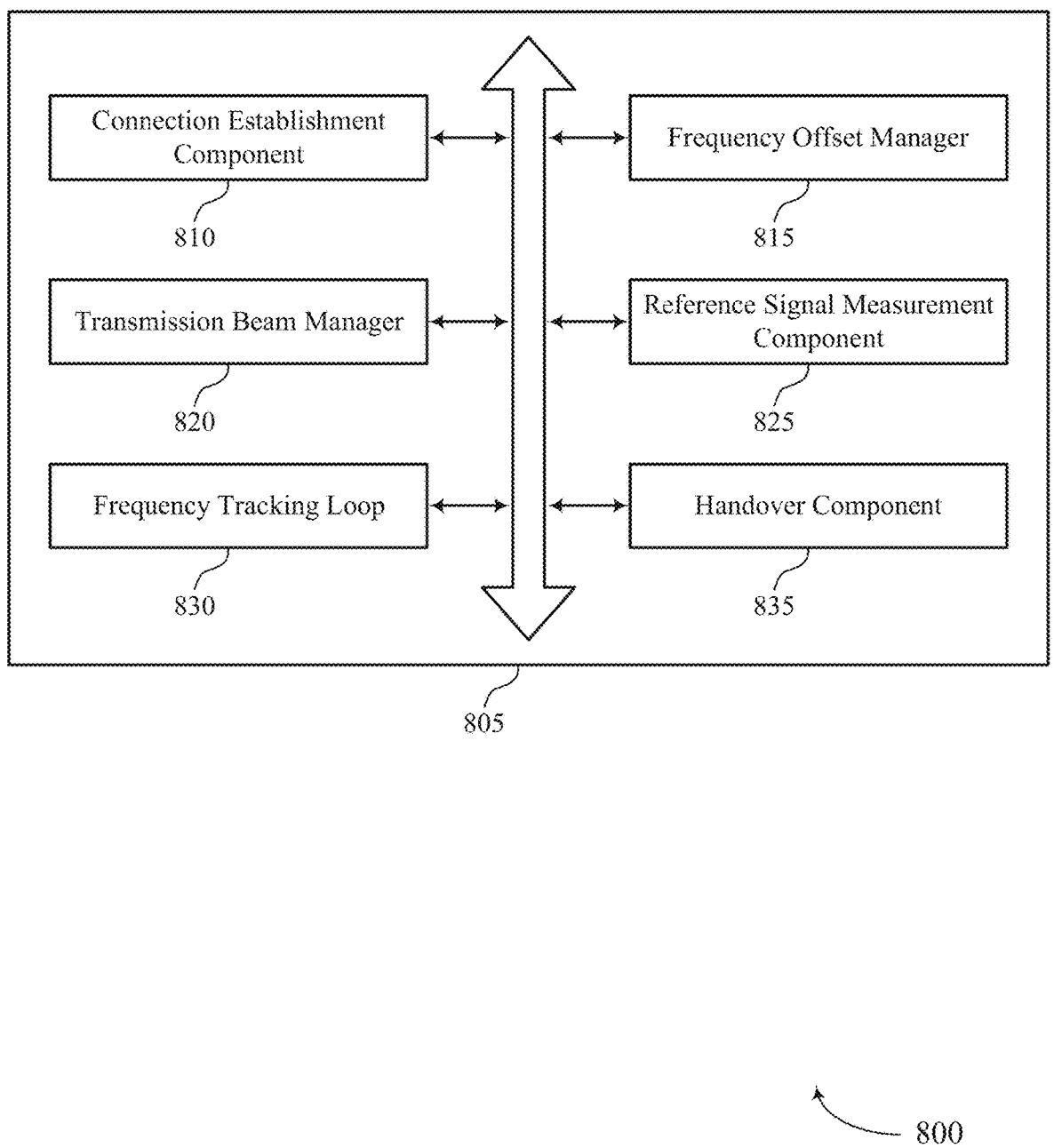
FIG. 8 shows a block diagram of a communications manager that supports frequency offset adjustment for beam switching in wireless communications in accordance with aspects of the present disclosure.

FIG. 8 shows a block diagram 800 of a communications manager 805 that supports frequency offset adjustment for beam switching in wireless communications in accordance with aspects of the present disclosure. The communications manager 805 may be an example of aspects of a communications manager 615, a communications manager 715, or a communications manager 910 described herein. The communications manager 805 may include a connection establishment component 810, a frequency offset manager 815, a transmission beam manager 820, a reference signal measurement component 825, a frequency tracking loop 830, and a handover component 835. Each of these modules may communicate, directly or indirectly, with one another (e.g., via one or more buses).

The connection establishment component 810 may establish a wireless connection with a wireless node via a first UL/DL transmission/reception beam pair.

The frequency offset manager 815 may determine a frequency offset difference between the first UL/DL transmission/reception beam pair and a second UL/DL transmission/reception beam pair. In some examples, the frequency offset manager 815 may adjust a frequency tracking loop for communications via the second UL/DL transmission/reception beam pair based on the determined frequency offset difference.

In some examples, the frequency offset manager 815 may measure a set of frequency offsets associated with a set of UL/DL transmission/reception beam pairs, and may store each measured frequency offset in a table. In some examples, the frequency offset manager 815 may read, from the table, a first measured frequency offset associated with the first UL/DL transmission/reception beam pair and a second measured frequency offset associated with the second UL/DL transmission/reception beam pair, where the first measured frequency offset is a most recently updated frequency offset measurement associated with the first UL/DL transmission/reception beam pair. In some examples, the frequency offset manager 815 may subtract the first measured frequency offset from the second measured frequency offset.

In some examples, the frequency offset manager 815 may receive a first reference signal via a first downlink beam QCLed with the first UL/DL transmission/reception beam.

In some examples, the frequency offset manager 815 may determine a first frequency offset associated with the first reference signal based on a current state of the frequency tracking loop and a first measured frequency of the first reference signal. In some examples, the frequency offset manager 815 may receive a second reference signal via a second downlink beam QCLed with the second UL/DL transmission/reception beam. In some examples, the frequency offset manager 815 may determine a second frequency offset associated with the second reference signal based on the current state of the frequency tracking loop and a second measured frequency of the second reference signal. In some examples, the frequency offset manager 815 may determine the frequency offset difference based on a difference between the first frequency offset and the second frequency offset. In some cases, a set of frequency offset differences is maintained for a set of different UL/DL transmission/reception beam pairs for application to a single frequency tracking loop.

The transmission beam manager 820 may switch the wireless connection from the first UL/DL transmission/reception beam pair to the second UL/DL transmission/reception beam pair. In some cases, the first UL/DL transmission/reception beam pair and the second UL/DL transmission/reception beam pair include serving beams for a UE, receive beams of the UE, transmit beams for the UE, or any combinations thereof. In some cases, the first transmission beam and the second transmission beam include beamformed millimeter wave transmission beams or non-beamformed lower frequency beams.

The reference signal measurement component 825 may measure frequency offsets from a current state of the frequency tracking loop based on received reference signals that are QCLed with one or more different transmit beams. In some cases, the measuring of the set of frequency offsets is based on a reference signal transmitted via downlink beams associated with each UL/DL transmission/reception beam pair. In some cases, the reference signal includes one or more synchronization signals received in a synchronization signal block (SSB), a tracking reference signal (TRS), a channel state information reference signal (CSI-RS), a phase tracking reference signal (PTRS), a demodulation reference signal (DMRS), or any combination thereof.

The frequency tracking loop 830 may compensate for frequency errors (e.g., due to Doppler shift or ppm differences between transmit and receive sides) in received transmissions based on frequency offset measurements. In some cases, the adjusting the frequency tracking loop includes applying a one-shot adjustment to the frequency tracking loop prior to an UL/DL transmission/reception via the second UL/DL transmission/reception beam pair. In some cases, the adjusting the frequency tracking loop is synchronized with a time for switching the wireless connection from the first UL/DL transmission/reception beam pair to the second UL/DL transmission/reception beam pair. In some cases, the time for switching the wireless connection is determined at a UE or is synchronized with beam switching at the wireless node based on a control transmission from the wireless node. In some cases, a single frequency tracking loop is used for a set of UL/DL transmission/reception beam pairs based on corresponding frequency offset differences associated with the set of UL/DL transmission/reception beam pairs.

The handover component 835 may manage a handover between different cells. In some cases, the first UL/DL transmission/reception beam pair is associated with a first cell, and the second UL/DL transmission/reception beam pair is associated with a second cell, and where the switching corresponds to a handover operation between the first cell and the second cell.

Figure 9:
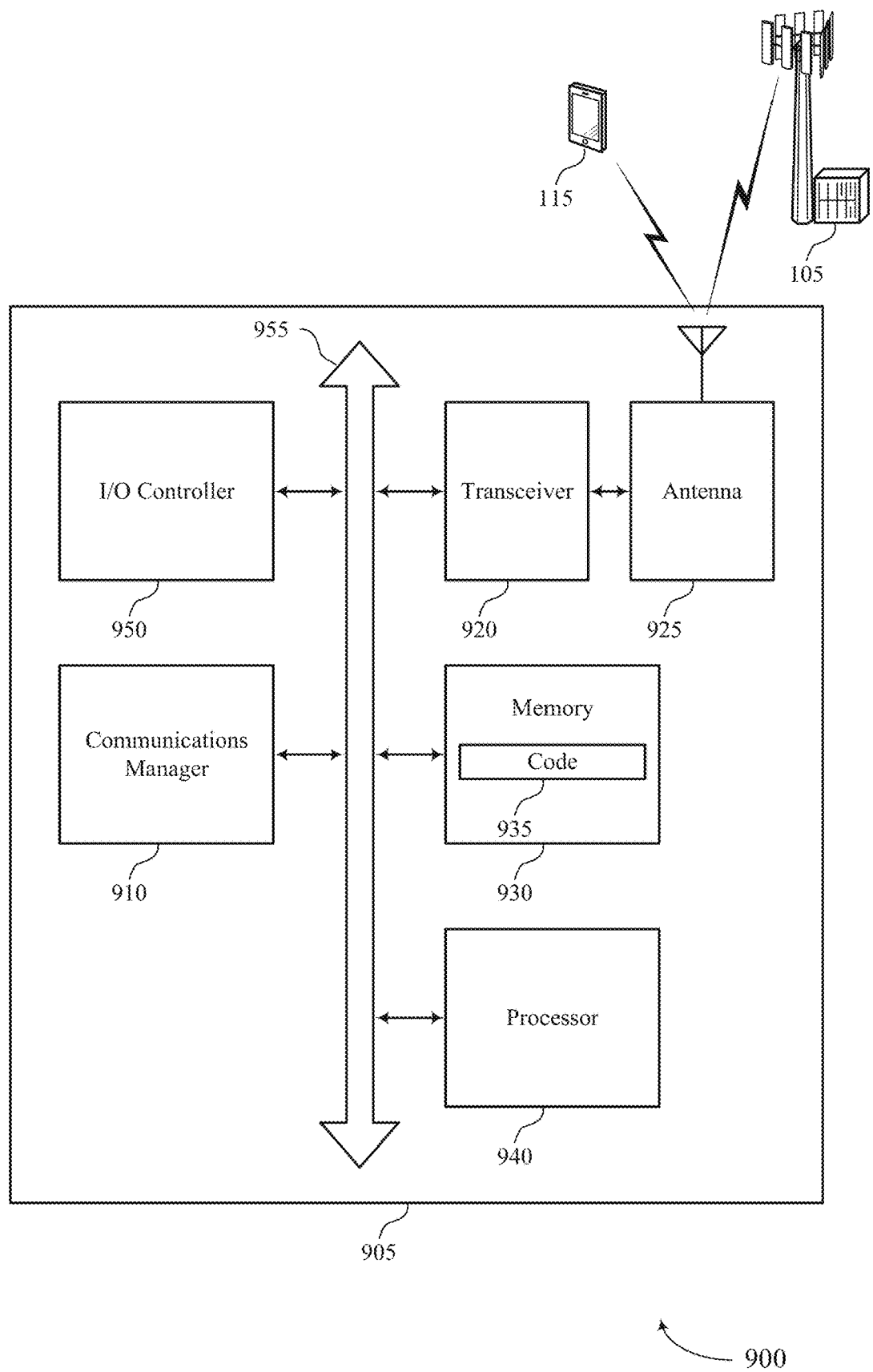
FIG. 9 shows a diagram of a system including a user equipment (UE) that supports frequency offset adjustment for beam switching in wireless communications in accordance with aspects of the present disclosure.

FIG. 9 shows a diagram of a system 900 including a device 905 that supports frequency offset adjustment for beam switching in wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may establish a wireless connection with a wireless node via a first UL/DL transmission/reception beam pair, determine a frequency offset difference between the first UL/DL transmission/reception beam pair and a second UL/DL transmission/reception beam pair, adjust a frequency tracking loop for communications via the second UL/DL transmission/reception beam pair based on the determined frequency offset difference, and switch the wireless connection from the first UL/DL transmission/reception beam pair to the second UL/DL transmission/reception beam pair.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting frequency offset adjustment for beam switching in wireless communications).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
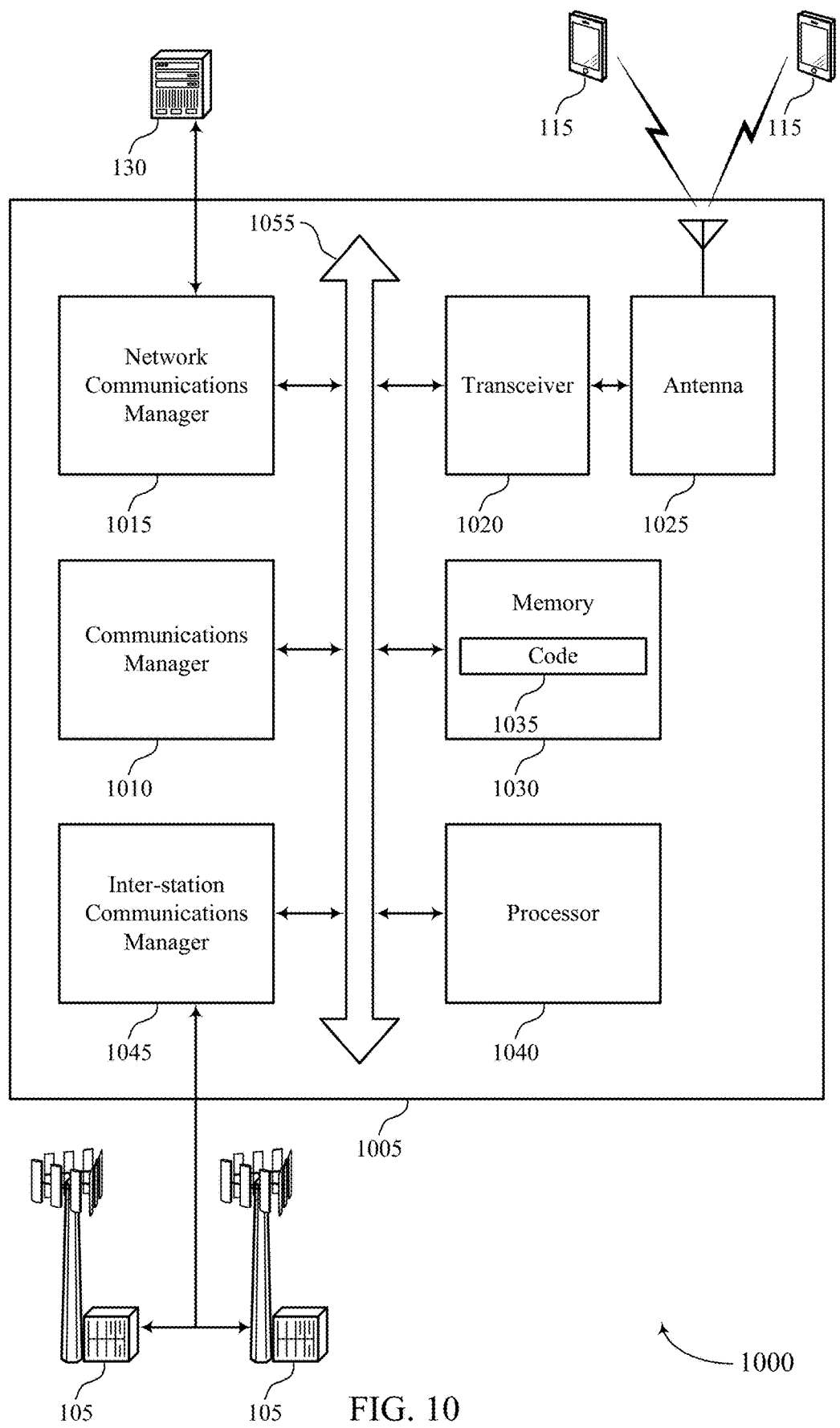
FIG. 10 shows a diagram of a system including a base station that supports frequency offset adjustment for beam switching in wireless communications in accordance with aspects of the present disclosure.

FIG. 10 shows a diagram of a system 1000 including a device 1005 that supports frequency offset adjustment for beam switching in wireless communications in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may establish a wireless connection with a wireless node via a first UL/DL transmission/reception beam pair, determine a frequency offset difference between the first UL/DL transmission/reception beam pair and a second UL/DL transmission/reception beam pair, adjust a frequency tracking loop for communications via the second UL/DL transmission/reception beam pair based on the determined frequency offset difference, and switch the wireless connection from the first UL/DL transmission/reception beam pair to the second UL/DL transmission/reception beam pair.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting frequency offset adjustment for beam switching in wireless communications).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
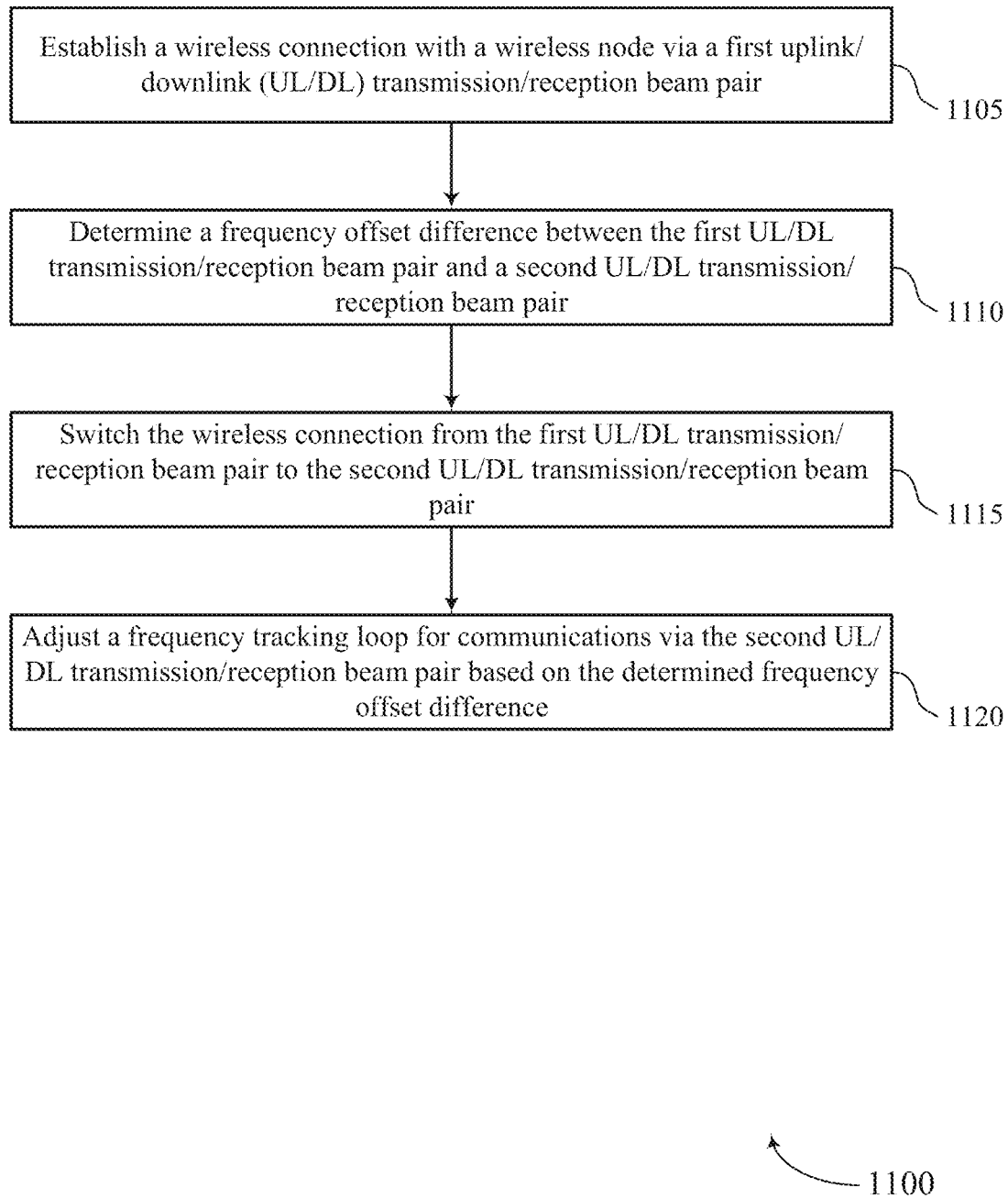
FIGS. 11 through 13 show flowcharts illustrating methods that support frequency offset adjustment for beam switching in wireless communications in accordance with aspects of the present disclosure.

FIG. 11 shows a flowchart illustrating a method 1100 that supports frequency offset adjustment for beam switching in wireless communications in accordance with aspects of the present disclosure. The operations of method 1100 may be implemented by a UE 115 or base station 105 or its components as described herein. For example, the operations of method 1100 may be performed by a communications manager as described with reference to FIGS. 6 through 10. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may establish a wireless connection with a wireless node via a first UL/DL transmission/reception beam pair. The operations of 1105 may be performed according to the methods described herein. In some examples, aspects of the operations of 1105 may be performed by a connection establishment component as described with reference to FIGS. 6 through 10.

At 1110, the UE or base station may determine a frequency offset difference between the first UL/DL transmission/reception beam pair and a second UL/DL transmission/reception beam pair. The operations of 1110 may be performed according to the methods described herein. In some examples, aspects of the operations of 1110 may be performed by a frequency offset manager as described with reference to FIGS. 6 through 10.

At 1115, the UE or base station may switch the wireless connection from the first UL/DL transmission/reception beam pair to the second UL/DL transmission/reception beam pair. The operations of 1115 may be performed according to the methods described herein. In some examples, aspects of the operations of 1115 may be performed by a transmission beam manager as described with reference to FIGS. 6 through 10. In some cases, the first UL/DL transmission/reception beam pair and the second UL/DL transmission/reception beam pair include serving beams for a UE, receive beams of the UE, transmit beams for the UE, or any combinations thereof.

At 1120, the UE or base station may adjust a frequency tracking loop for communications via the second UL/DL transmission/reception beam pair based on the determined frequency offset difference. The operations of 1120 may be performed according to the methods described herein. In some examples, aspects of the operations of 1120 may be performed by a frequency offset manager as described with reference to FIGS. 6 through 10. In some cases, the adjusting the frequency tracking loop includes applying a one-shot adjustment to the frequency tracking loop prior to an UL/DL transmission/reception via the second UL/DL transmission/reception beam pair. In some cases, the adjusting the frequency tracking loop is synchronized with a time for switching the wireless connection from the first UL/DL transmission/reception beam pair to the second UL/DL transmission/reception beam pair. In some cases, the time for switching the wireless connection is determined at a UE or is synchronized with beam switching at the wireless node based on a control transmission from the wireless node.

In some cases, a single frequency tracking loop is used for a set of UL/DL transmission/reception beam pairs based on corresponding frequency offset differences associated with the set of UL/DL transmission/reception beam pairs. In some cases, the first transmission beam is associated with a first cell, and the second transmission beam is associated with a second cell, and where the switching corresponds to a handover operation between the first cell and the second cell.

Figure 12:
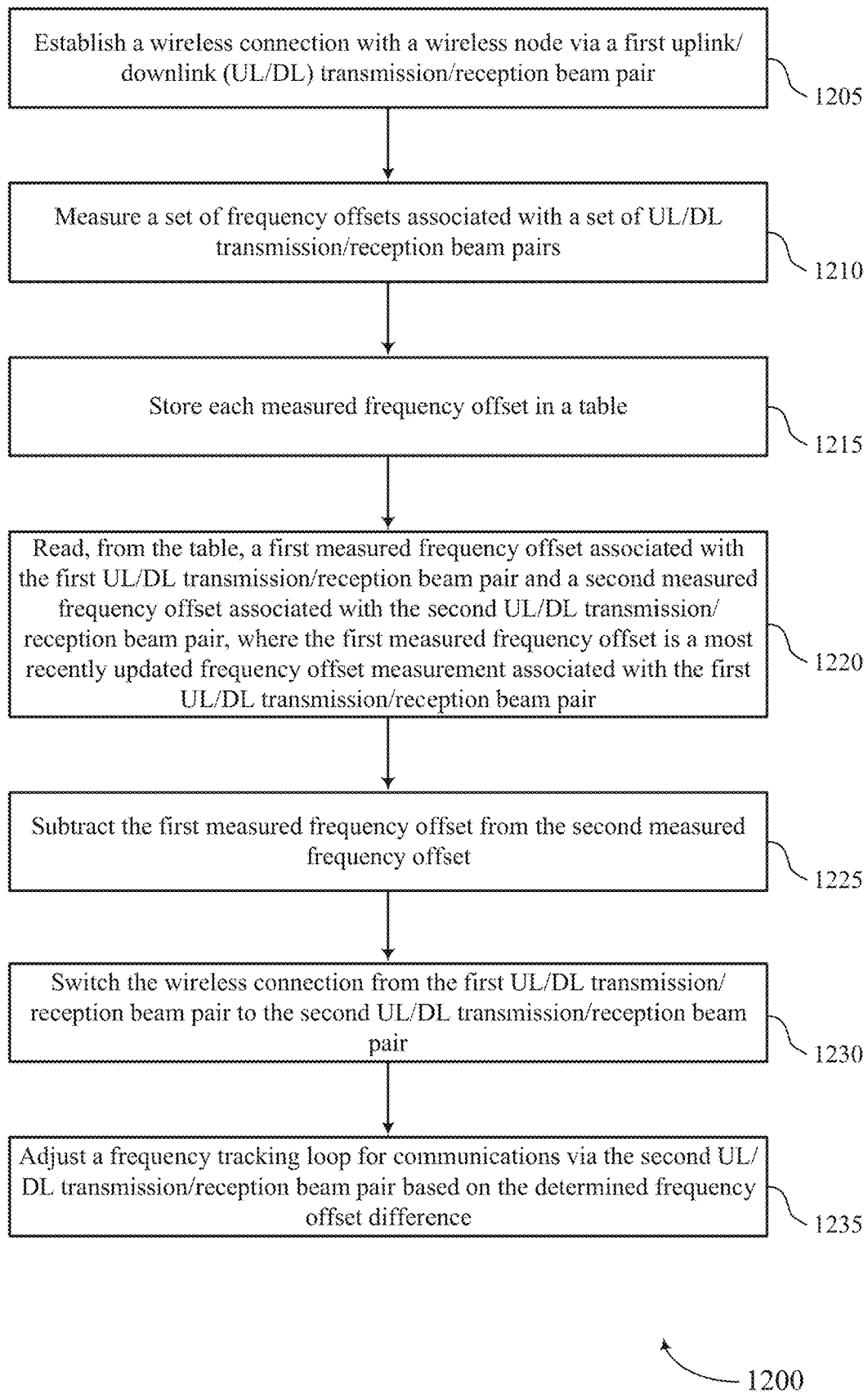

FIG. 12 shows a flowchart illustrating a method 1200 that supports frequency offset adjustment for beam switching in wireless communications in accordance with aspects of the present disclosure. The operations of method 1200 may be implemented by a UE 115 or its components as described herein. For example, the operations of method 1200 may be performed by a communications manager as described with reference to FIGS. 6 through 10. In some examples, a UE may execute a set of instructions to control the functional elements of the UE to perform the functions described below. Additionally or alternatively, a UE may perform aspects of the functions described below using special-purpose hardware.

At 1205, the UE may establish a wireless connection with a wireless node via a first UL/DL transmission/reception beam pair. The operations of 1205 may be performed according to the methods described herein. In some examples, aspects of the operations of 1205 may be performed by a connection establishment component as described with reference to FIGS. 6 through 10.

At 1210, the UE may measure a set of frequency offsets associated with a set of UL/DL transmission/reception beam pairs. The operations of 1210 may be performed according to the methods described herein. In some examples, aspects of the operations of 1210 may be performed by a frequency offset manager as described with reference to FIGS. 6 through 10.

At 1215, the UE may store each measured frequency offset in a table. The operations of 1215 may be performed according to the methods described herein. In some examples, aspects of the operations of 1215 may be performed by a frequency offset manager as described with reference to FIGS. 6 through 10.

At 1220, the UE may read, from the table, a first measured frequency offset associated with the first UL/DL transmission/reception beam pair and a second measured frequency offset associated with the second UL/DL transmission/reception beam pair, where the first measured frequency offset is a most recently updated frequency offset measurement associated with the first UL/DL transmission/reception beam pair. The operations of 1220 may be performed according to the methods described herein. In some examples, aspects of the operations of 1220 may be performed by a frequency offset manager as described with reference to FIGS. 6 through 10. In some cases, each time a DL serving beam is switched (i.e., a transmit/receive beam pair change), or only DL receive beam is switched, and the frequency tracking loop is adjusted, the corresponding entries the table are updated with the beam switch frequency offset correction. In some cases, the differential correction that is used to move the frequency tracking loop state changes the loop reference point, and thus all the measurements in the table are updated accordingly with the loop state change.

At 1225, the UE may subtract the first measured frequency offset from the second measured frequency offset. The operations of 1225 may be performed according to the methods described herein. In some examples, aspects of the operations of 1225 may be performed by a frequency offset manager as described with reference to FIGS. 6 through 10. In some cases, the measuring the set of frequency offsets is based on a reference signal transmitted via a downlink beam QCLed with a UL/DL transmission/reception beam. In some cases, the reference signal includes one or more of a synchronization signal received in a synchronization signal block (SSB), a tracking reference signal (TRS), a channel state information reference signal (CSI-RS), a phase tracking reference signal (PTRS), a demodulation reference signal, or any combination thereof. The operations of 1235 may be performed according to the methods described herein. In some examples, aspects of the operations of 1235 may be performed by a reference signal measurement component as described with reference to FIGS. 6 through 10.

At 1230, the UE may switch the wireless connection from the first UL/DL transmission/reception beam pair to the second UL/DL transmission/reception beam pair. The operations of 1230 may be performed according to the methods described herein. In some examples, aspects of the operations of 1230 may be performed by a transmission beam manager as described with reference to FIGS. 6 through 10.

At 1235, the UE may adjust a frequency tracking loop for communications via the second UL/DL transmission/reception beam pair based on the determined frequency offset difference. The operations of 1235 may be performed according to the methods described herein. In some examples, aspects of the operations of 1235 may be performed by a frequency offset manager as described with reference to FIGS. 6 through 10.

Figure 13:
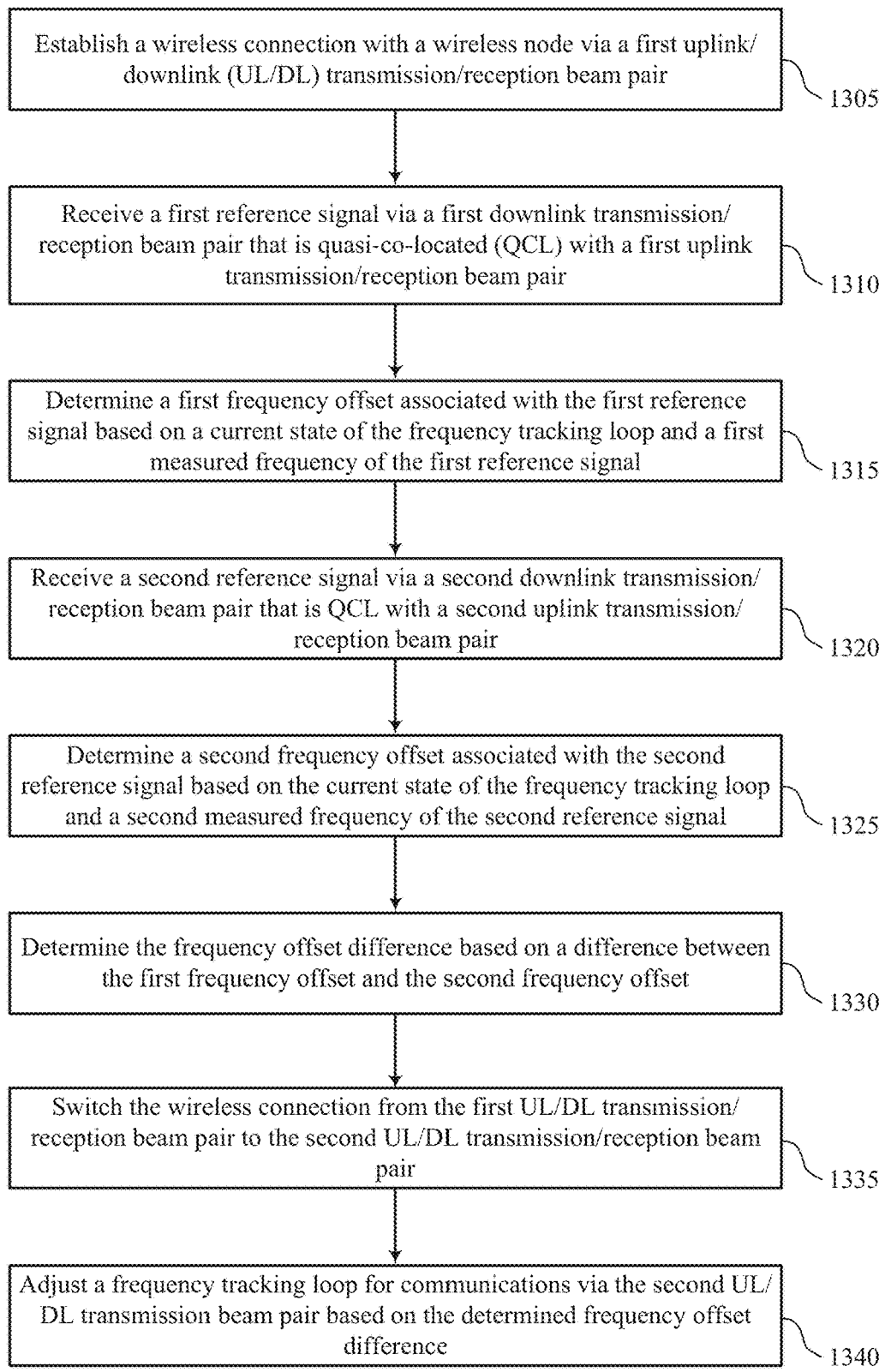

FIG. 13 shows a flowchart illustrating a method 1300 that supports frequency offset adjustment for beam switching in wireless communications in accordance with aspects of the present disclosure. The operations of method 1300 may be implemented by a UE 115 or its components as described herein. For example, the operations of method 1300 may be performed by a communications manager as described with reference to FIGS. 6 through 10. In some examples, a UE may execute a set of instructions to control the functional elements of the UE to perform the functions described below. Additionally or alternatively, a UE may perform aspects of the functions described below using special-purpose hardware.

At 1305, the UE may establish a wireless connection with a wireless node via a first UL/DL transmission/reception beam pair. The operations of 1305 may be performed according to the methods described herein. In some examples, aspects of the operations of 1305 may be performed by a connection establishment component as described with reference to FIGS. 6 through 10.

At 1310, the UE may receive a first reference signal via a first downlink beam of the first UL/DL transmission/reception beam pair. The operations of 1310 may be performed according to the methods described herein. In some examples, aspects of the operations of 1310 may be performed by a frequency offset manager as described with reference to FIGS. 6 through 10.

At 1315, the UE may determine a first frequency offset associated with the first reference signal based on a current state of the frequency tracking loop and a first measured frequency of the first reference signal. The operations of 1315 may be performed according to the methods described herein. In some examples, aspects of the operations of 1315 may be performed by a frequency offset manager as described with reference to FIGS. 6 through 10.

At 1320, the UE may receive a second reference signal via a second downlink beam of the second UL/DL transmission/reception beam pair. The operations of 1320 may be performed according to the methods described herein. In some examples, aspects of the operations of 1320 may be performed by a frequency offset manager as described with reference to FIGS. 6 through 10.

At 1325, the UE may determine a second frequency offset associated with the second reference signal based on the current state of the frequency tracking loop and a second measured frequency of the second reference signal. The operations of 1325 may be performed according to the methods described herein. In some examples, aspects of the operations of 1325 may be performed by a frequency offset manager as described with reference to FIGS. 6 through 10.

At 1330, the UE may determine the frequency offset difference based on a difference between the first frequency offset and the second frequency offset. The operations of 1330 may be performed according to the methods described herein. In some examples, aspects of the operations of 1330 may be performed by a frequency offset manager as described with reference to FIGS. 6 through 10.

At 1335, the UE may switch the wireless connection from the first UL/DL transmission/reception beam pair to the second UL/DL transmission/reception beam pair. The operations of 1335 may be performed according to the methods described herein. In some examples, aspects of the operations of 1335 may be performed by a transmission beam manager as described with reference to FIGS. 6 through 10. In some cases, each time a DL serving beam is switched (i.e., a transmit/receive beam pair change), or only DL receive beam is switched, and the frequency tracking loop is adjusted, the corresponding entries a table of frequency offsets are updated with the beam switch frequency offset correction. In some cases, the differential correction that is used to move the frequency tracking loop state changes the loop reference point, and thus all the measurements in the table are updated accordingly with the loop state change.

At 1340, the UE may adjust a frequency tracking loop for communications via the second UL/DL transmission/reception beam pair based on the determined frequency offset difference. The operations of 1340 may be performed according to the methods described herein. In some examples, aspects of the operations of 1340 may be performed by a frequency offset manager as described with reference to FIGS. 6 through 10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   establishing a wireless connection with a wireless node via a first beam pair, wherein a frequency tracking loop compensates for a frequency shift associated with the first beam pair;
   determining a frequency offset difference between the first beam pair and a second beam pair;
   switching the wireless connection from the first beam pair to the second beam pair; and
   adjusting the frequency tracking loop for communications via the second beam pair based at least in part on the determined frequency offset difference between the first beam pair and the second beam pair.

2. The method of claim 1, further comprising:
   measuring a plurality of frequency offsets associated with a plurality of beam pairs; and
   storing each measured frequency offset in a table.

3. The method of claim 2, wherein the determining the frequency offset difference between the first beam pair and the second beam pair comprises:
   reading, from the table, a first measured frequency offset associated with the first beam pair and a second measured frequency offset associated with the second beam pair, wherein the first measured frequency offset is a most recently updated frequency offset measurement associated with the first beam pair and the second measured frequency offset is a most recently updated frequency offset measurement associated with the second beam pair; and
   subtracting the first measured frequency offset from the second measured frequency offset.

4. The method of claim 2, wherein the measuring the plurality of frequency offsets is based at least in part on a reference signal transmitted via a downlink beam associated with each beam pair of the plurality of beam pairs.

5. The method of claim 4, wherein the reference signal comprises one or more of synchronization signals received in a synchronization signal block (SSB), a tracking reference signal (TRS), a channel state information reference signal (CSI-RS), a phase tracking reference signal (PTRS), a demodulation reference signal (DMRS), or any combination thereof.

6. The method of claim 2, further comprising:
   updating, responsive to the switching the wireless connection, each of the measured frequency offsets in the table based at least in part on the determined frequency offset difference applied as an adjustment to the frequency tracking loop.

7. The method of claim 1, wherein the first beam pair and the second beam pair comprise serving beams for a user equipment (UE), receive beams of the UE, transmit beams for the UE, or any combinations thereof.

8. The method of claim 1, wherein the adjusting the frequency tracking loop comprises applying a one-shot adjustment to the frequency tracking loop prior to a transmission or reception via the second beam pair.

9. The method of claim 1, wherein the adjusting the frequency tracking loop is synchronized with a time for switching the wireless connection from the first beam pair to the second beam pair.

10. The method of claim 9, wherein the time for switching the wireless connection is determined at a user equipment (UE) or is synchronized with beam switching at the wireless node based on a control transmission from the wireless node.

11. The method of claim 1, wherein a single frequency tracking loop is used for a plurality of beam pairs based at least in part on corresponding frequency offset differences associated with the plurality of beam pairs.

12. The method of claim 1, wherein a plurality of frequency offset differences is maintained for a plurality of different beam pairs for application to a single frequency tracking loop.

13. The method of claim 1, wherein the determining the frequency offset difference comprises:
   receiving a first reference signal via a first downlink beam that is quasi-co-located (QCL) with a first uplink beam;
   determining a first frequency offset associated with the first reference signal based at least in part on a current state of the frequency tracking loop and a first measured frequency of the first reference signal;
   receiving a second reference signal via a second downlink beam that is QCL with a second uplink beam;
   determining a second frequency offset associated with the second reference signal based at least in part on the current state of the frequency tracking loop and a second measured frequency of the second reference signal; and
   determining the frequency offset difference based at least in part on a difference between the first frequency offset and the second frequency offset.

14. The method of claim 1, wherein the first beam pair and the second beam pair comprise beamformed millimeter wave transmission beams or non-beamformed lower frequency beams.

15. The method of claim 1, wherein the first beam pair is associated with a first cell, and the second beam pair is associated with a second cell, and wherein the switching corresponds to a handover operation between the first cell and the second cell.

16. The method of claim 1, wherein the first beam pair is associated with a first active transmission configuration indicator (TCI) state and the second beam pair is associated with a second active TCI state, and wherein the switching corresponds to switching wireless communications between the first active TCI state and the second active TCI state.

17. A method for wireless communications, comprising:
   establishing a wireless connection with a first wireless node via a first link with a first cell;
   initiating a single frequency tracking loop for communications via the first link, wherein the single frequency tracking loop compensates for a frequency shift associated with the first link;
   determining a frequency offset difference between the first link and a second link with a second cell;
   switching, responsive to a handover command, the wireless connection from the first link to the second link; and
   adjusting the single frequency tracking loop for use in communications via the second link based at least in part on the determined frequency offset difference between the first link and the second link.

18. The method of claim 17, wherein the first link and the second link are non-beamformed links.

19. The method of claim 17, further comprising:
   measuring a plurality of frequency offsets associated with a plurality of cells; and
   storing each measured frequency offset in a table.

20. The method of claim 19, further comprising:
   updating, responsive to completing the handover command, each of the measured frequency offsets in the table based at least in part on the determined frequency offset difference applied as an adjustment to the frequency tracking loop.

21. The method of claim 17, wherein the adjusting the single frequency tracking loop comprises applying a one-shot adjustment to the single frequency tracking loop prior to a transmission or reception via the second link.

22. An apparatus for wireless communications, comprising: a processor, a memory in electronic communication with the processor; and
instructions stored in the memory and executable by the processor to cause the apparatus to:
establish a wireless connection with a wireless node via a first beam pair, wherein a frequency tracking loop compensates for a frequency shift associated with the first beam pair;
determine a frequency offset difference between the first beam pair and a second beam pair;
switch the wireless connection from the first beam pair to the second beam pair; and
adjust the frequency tracking loop for communications via the second beam pair based at least in part on the determined frequency offset difference between the first beam pair and the second beam pair.

23. The apparatus of claim 22, wherein the instructions are further executable by the processor to cause the apparatus to:
measure a plurality of frequency offsets associated with a plurality of beam pairs; and
store each measured frequency offset in a table.

24. The apparatus of claim 23, wherein the instructions are further executable by the processor to cause the apparatus to:
read, from the table, a first measured frequency offset associated with the first beam pair and a second measured frequency offset associated with the second beam pair, wherein the first measured frequency offset is a most recently updated frequency offset measurement associated with the first beam pair and the second measured frequency offset is a most recently updated frequency offset measurement associated with the second beam pair; and
subtract the first measured frequency offset from the second measured frequency offset.

25. The apparatus of claim 23, wherein the instructions are further executable by the processor to cause the apparatus to:
update, responsive to the switch of the wireless connection, each of the measured frequency offsets in the table based at least in part on the determined frequency offset difference applied as an adjustment to the frequency tracking loop.

26. The apparatus of claim 22, wherein the adjusting the frequency tracking loop comprises applying a one-shot adjustment to the frequency tracking loop prior to a transmission or reception via the second beam pair.

27. An apparatus for wireless communications, comprising:
means for establishing a wireless connection with a wireless node via a first beam pair, wherein a frequency tracking loop compensates for a frequency shift associated with the first beam pair;
means for determining a frequency offset difference between the first beam pair and a second beam pair;
means for switching the wireless connection from the first beam pair to the second beam pair; and
means for adjusting the frequency tracking loop for communications via the second beam pair based at least in part on the determined frequency offset difference between the first beam pair and the second beam pair.

28. The apparatus of claim 27, further comprising:
means for measuring a plurality of frequency offsets associated with a plurality of beam pairs; and
means for storing each measured frequency offset in a table.

29. The apparatus of claim 27, wherein the adjusting the frequency tracking loop comprises applying a one-shot adjustment to the frequency tracking loop prior to a transmission or reception via the second beam pair.

30. The apparatus of claim 27, wherein a single frequency tracking loop is used for a plurality of beam pairs based at least in part on corresponding frequency offset differences associated with the plurality of beam pairs.

* * * * *